United States Patent
Watanabe et al.

(10) Patent No.: US 6,384,967 B1
(45) Date of Patent: May 7, 2002

(54) ILLUMINATION APPARATUS FOR A MICROSCOPE

(75) Inventors: Akira Watanabe, Hino; Minoru Sukekawa, Akiruno; Shunichi Kubota, Hino; Shinji Matsushita, Ome, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/394,445

(22) Filed: Sep. 9, 1999

(30) Foreign Application Priority Data

Sep. 11, 1998 (JP) .......................... 10-258371
Sep. 24, 1998 (JP) .......................... 10-269562

(51) Int. Cl.$^7$ ............................................. G02B 21/06
(52) U.S. Cl. ...................... 359/385; 359/381; 359/388
(58) Field of Search .................... 359/381, 385, 359/386, 387, 389, 388

(56) References Cited

U.S. PATENT DOCUMENTS

| | | | |
|---|---|---|---|
| 4,363,532 A | * 12/1982 | Weber | 359/385 |
| 4,643,540 A | * 2/1987 | Kawasaki et al. | 359/388 |
| 5,703,714 A | * 12/1997 | Kojima | 359/368 |
| 5,706,128 A | * 1/1998 | Greenberg | 359/385 |
| 5,896,224 A | * 4/1999 | Kapitza | 359/389 |

FOREIGN PATENT DOCUMENTS

| | | |
|---|---|---|
| JP | 6-337359 | 12/1994 |
| JP | 7-209584 | 8/1995 |
| JP | 9-21957 | 1/1997 |

* cited by examiner

Primary Examiner—Cassandra Spyrou
Assistant Examiner—Mark A. Robinson
(74) Attorney, Agent, or Firm—Frishauf, Holtz, Goodman, Langer & Chick, P.C.

(57) ABSTRACT

An illumination apparatus of the present invention used for a microscope to guide illumination light to an objective lens attached to a revolving nosepiece comprises a light source for radiating the illumination light, an optical system for guiding the illumination light radiated from the light source, to the objective lens, an aperture diaphragm switching section provided in the optical system and having a plurality of aperture diaphragms and a light shielding portion, for switching the aperture diaphragm on the illumination light, linked with motion of the revolving nosepiece, when switching an observation method or the objective lens, and a control circuit for controlling operation of at least one of the aperture diaphragm switching section and the revolving nosepiece such that amount of light entering into the objective lens is prevented from undesirably increasing, when the observation method or the objective lens is switched.

5 Claims, 14 Drawing Sheets

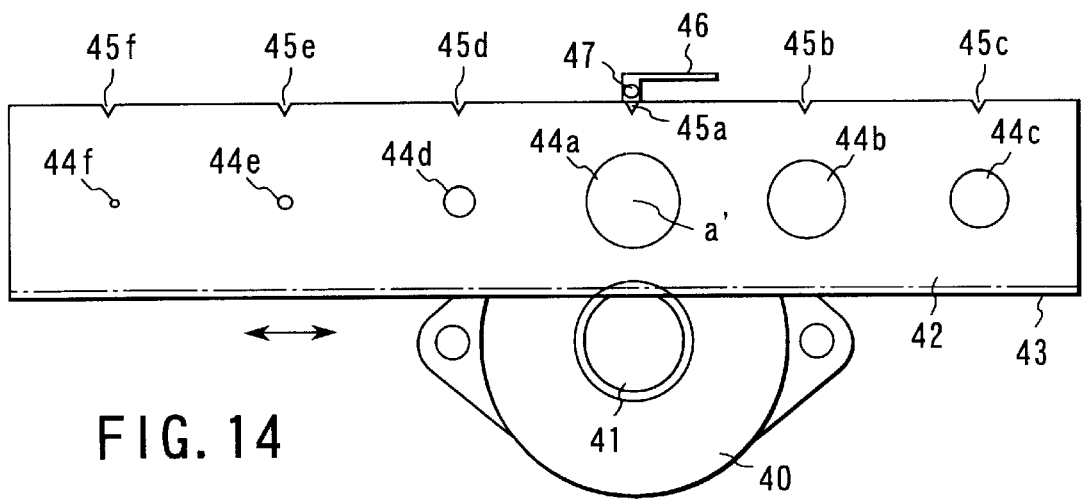
FIG. 14
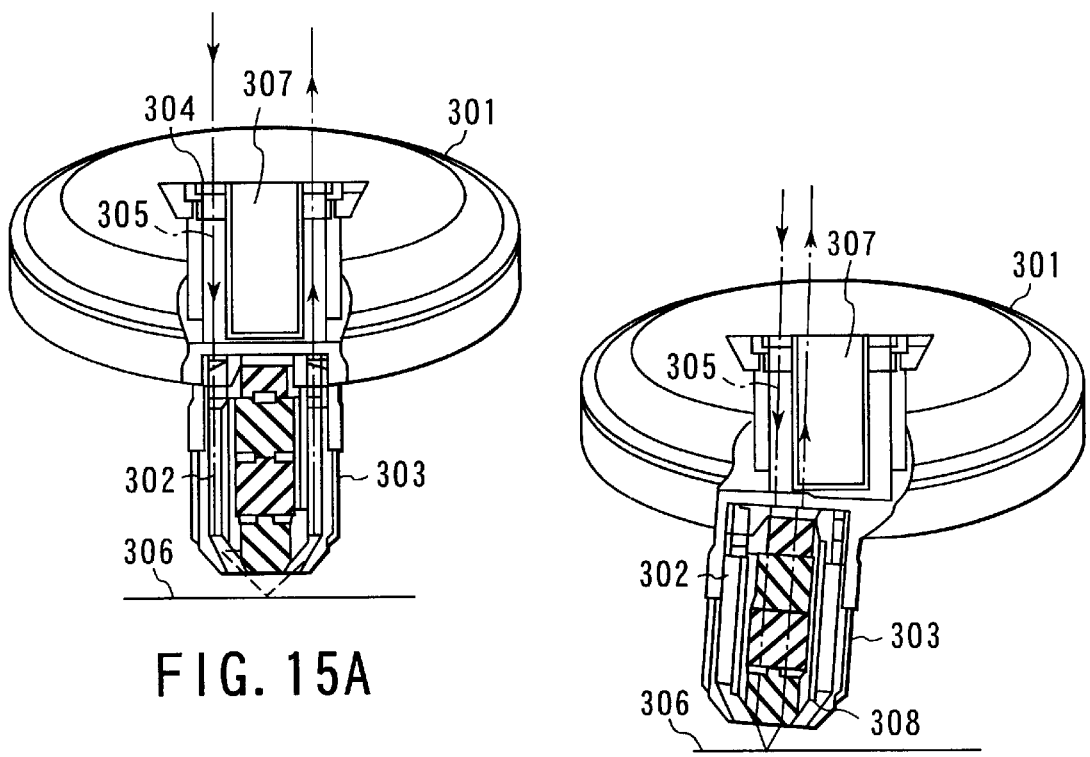
FIG. 15A
FIG. 15B

ILLUMINATION APPARATUS FOR A MICROSCOPE

BACKGROUND OF THE INVENTION

The present invention relates to an illumination apparatus for a microscope in which the diameter of an aperture diaphragm or the like is switched in association with switching of an observation method or an objective lens.

In an illumination (an incident illumination, a projection illumination) observation microscope, illumination light radiated from an illumination light source is passed through an objective lens and irradiated onto a sample. Reflection light from the sample is passed through the objective lens again so as to enter into an eyepiece lens or a television camera, thus achieving observation. In this microscope, a plurality of objective lenses are attached to a revolving nosepiece (revolver), and observation can be performed while changing the magnification by rotating the revolving nosepiece.

Recently, in many revolving nosepieces of this type, objective lenses are changed from each other by electrically rotating the revolving nosepiece. There are also microscopes in which other various operating sections are electrified in addition to the revolving nosepiece so that operation is facilitated. In particular, if the aperture diaphragm and the field diaphragm in the illumination system are set to appropriate diaphragm diameters in compliance with the objective lens and in accordance with a bright field illumination observation method or a dark field illumination observation method, the optical performance can be extracted at maximum. Therefore, there has been provided a microscope which changes the diaphragm diameter under electric control in association with the revolving nosepiece.

For example, the aperture diaphragm and the field diaphragm in the bright field illumination observation takes various optimum diameters depending on the magnifications of the objective lenses and the pupil diameter. Therefore, control is performed so as to change the diaphragm diameters every time when the revolving nosepiece is switched. In addition, the aperture diaphragm and the field diaphragm in the dark field illumination observation are basically set to the maximum diameters, i.e., released in order to maximum use of the illumination light. These diaphragms are automatically switched to the maximum diameters when the dark field illumination is carried out.

FIGS. 15A and 15B are partial cross-sectional views showing a revolving nosepiece and an objective lens in the dark field illumination described above. FIG. 15A shows a light passage of illumination light for normal dark field illumination. The revolving nosepiece 301 is equipped with an objective lens 303 having a ring-like dark field illumination light passage 302. When dark field illumination light 305 enters into a dark field illumination light passage 304, this light 305 passes through the dark field illumination light passage 302 of the objective lens 303 and is irradiated onto a sample 306. At this time, regular reflection light from the sample 306 is reflected at the same angle as the incident angle to the sample 306, and therefore does not enter into the observation light passage 307 of the objective lens 303. Accordingly, only scattered light from the sample 306 enters into the observation light passage 307, so that an effective dark field illumination observation method can be practiced by detecting feeble scattered light.

However, a problem of stray light occurs when the revolving nosepiece 301 is rotated to change the objective lens 303. FIG. 15B shows a light passage for illumination light halfway while the objective lens 303 is changed with another one. That is, the revolving nosepiece 301 starts rotating to change the objective lens 303, and the objective lens 303 is slightly inclined and deviates from its original optical axis. In this situation, a part (in form of a crescent moon) of the ring-like dark field illumination light 305 comes out of the range of the dark field illumination light passage 302 of the objective lens 303, and passes through the observation light passage 308 of the objective lens 303, to be irradiated onto the sample 306. Further, the regular reflection light from the sample 306 enters into the observation light passage 307 of the revolving nosepiece 301 while maintaining its large amount, so that unnecessary excessive light beams as stray light enter.

Normally, dark field observation is carried out by detecting feeble scattered light, so the light amount of the illumination light is large while the observation light is weak. Therefore, if a large amount of stray light enters into the observation light passages 307 and 308 even at an instant halfway while changing the objective lens 303, an observer takes a risk for eyes of his or her own and feels dazzled in case of eye observation, and bad influences may be effected on the image pick-up element in case of television observation.

With respect to the problem as described above, for example, a conventional apparatus adopts a method of inserting and then pulling out a special shutter at the same time when an objective lens is changed. However, in this case, it is necessary to use a special shutter mechanism and other components which are disadvantageous in view of costs.

In contrast, in place of using such a shutter, there is a method of electrically reducing the field diaphragm to the minimum diameter by means of an iris diaphragm (a plurality of diaphragm wings) to prevent stray light at the same time when changing an objective lens. In this case, however, thin iris diaphragm must be opened and closed every time when an objective is changed, so that the durability of the iris diaphragm may become unreliable. In addition, the speed at which the iris diaphragm is limited by the unreliableness of durability caused due to opening and closing of the iris diaphragm, and as a result, it takes a very long time to change an objective lens.

As a known example, Japanese Patent Application KOKAI Publication No. 6-337359 discloses that the power source of an illumination light source is shut off to prevent stray light when changing an objective lens. Further, Japanese Patent Application KOKAI Publication No. 7-209584 discloses that a revolving nosepiece is rotated after the light amount drops sufficiently when changing an objective lens.

Although this technique brings about an effect that a large amount of stray light is prevented from entering into observation light passages, the illumination light source is turned on and off so frequently that the lifetime of the illumination light source is shortened as a result. For example, in case of a halogen lamp generally used as an illumination light source, it has been known that the lifetime is shortened if it is repeatedly turned on and off. In addition, many light sources cannot be turned on and off simply (e.g., ark light sources such as mercury lamps and the like). If one of those light sources is used, stray light cannot be prevented from entering, by turning on and off the lamps. Further, each of the techniques described above adds another operation to various switching operations, so that only a low efficiency can be attained in view of the electric power and the durability.

There is another known technique in which a light reduction unit based on adjustment of the brightness of a light source or based on switching of an ND filter (Neutral density filter) is electrically controlled in accordance with the magnification and the transmittance of the objective lens, thereby to minimize the change of the brightness caused by switching (or changing) an objective lens. These functions are optionally and selectively equipped in compliance with the use frequency and the price range.

Japanese Patent Application KOKAI Publication No. 9-21957 discloses a microscope in which the aperture diaphragm and the light adjustment unit (or ND unit) are controlled to attain optimum conditions on the basis of various original data concerning objective lenses. Objective lenses have respectively different transmittance depending on the magnifications and the numerical apertures (NA). In general, an objective lens having a high magnification has a low transmittance (dark) while an objective lens having a low magnification has a high transmittance (bright). It is considered that the aperture diaphragm for extracting the maximum performance of an objective lens should appropriately be set to about 70% relative to the pupil diameter of each objective lens. In this case, the pupil diameter of an objective lens having a high magnification is small while the pupil diameter of an objective lens having a low magnification is large.

From the above, it is known that an objective lens having a high magnification has a low transmittance and the diameter of the aperture diaphragm thereof must be reduced. Therefore, the efficiency of illumination is low and an observed image becomes dark. An objective lens having a low magnification has a high transmittance and the diameter of the aperture diaphragm thereof is therefore large. Therefore, an observed image becomes bright. Also, as for a predetermined objective lens, the diameter of the aperture diaphragm is reduced to decrease the numerical aperture so that the depth of the image is improved, or the aperture diaphragm is used to emphasize the contrast.

The microscope disclosed in Japanese Patent Application KOKAI Publication No. 9-21957 extracts the maximum optical characteristics of every objective lens, and at the same time, corrects differences in brightness between objective lenses by a ND unit. An operator is capable of making an observation with equal brightness for each objective lens.

However, in case where an objective lens is switched or changed, there is a problem that an observed image is felt dazzling for an observer if the observed image has excessive brightness at an instant or more even while switching an objective lens. This problem must be avoided. For example, when switching an objective lens having a high magnification to an objective lens having a low magnification, care must be taken that an observed image having unnecessarily high brightness is not viewed by the observer at an instant.

Against the problem described above, a known example adopts a manner that a special shutter is inserted and pulled off when an objective lens is switched. Therefore, a shutter mechanism and components are required so that the structure is disadvantageous in view of costs. Also, as described previously, Japanese Patent Application KOKAI Publication No. 6-337359 discloses a microscope illumination apparatus by which the power source for an illumination light source is shut off to prevent stray light when an objective lens is switched. Further, as a similar technique, Japanese Patent Application KOKAI Publication No. 7-209584 previously described discloses a microscope control apparatus which rotates its revolving nosepiece after having waited for an enough drop of the light amount. These proposals, however, involve the problems described above.

In case of appropriately adjusting the aperture diaphragm in a predetermined objective lens, the observed image becomes dark as the aperture diaphragm is reduced while the observed image becomes bright as the aperture diaphragm is increased. However, changes of the light amount accompanying such a decrease or increase lead to disadvantages for an observer.

BRIEF SUMMARY OF THE INVENTION

The present invention has an object of providing an illumination apparatus for a microscope which improves prevention of dazzling when switching the objective lens or when switching the aperture diaphragm or when switching the observation method, with a simple structure.

An illumination apparatus of the present invention used for a microscope to guide illumination light to an objective lens attached to a revolving nosepiece comprises a light source for radiating the illumination light, an optical system for guiding the illumination light radiated from the light source, to the objective lens, an aperture diaphragm switching section provided in the optical system and having a plurality of aperture diaphragms and a light shielding portion, for switching the aperture diaphragm on the illumination light, linked with motion of the revolving nosepiece, when switching an observation method or the objective lens, and a control circuit for controlling operation of at least one of the aperture diaphragm switching section and the revolving nosepiece such that amount of light entering into the objective lens is prevented from undesirably increasing, when the observation method or the objective lens is switched.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 14 is a view showing the structure of a modification example of the aperture diaphragm turret.

FIGS. 15A and 15B are partial cross-sectional views showing a revolving nosepiece and an objective lens in the dark field illumination.

DETAILED DESCRIPTION OF THE INVENTION

Figure 1:
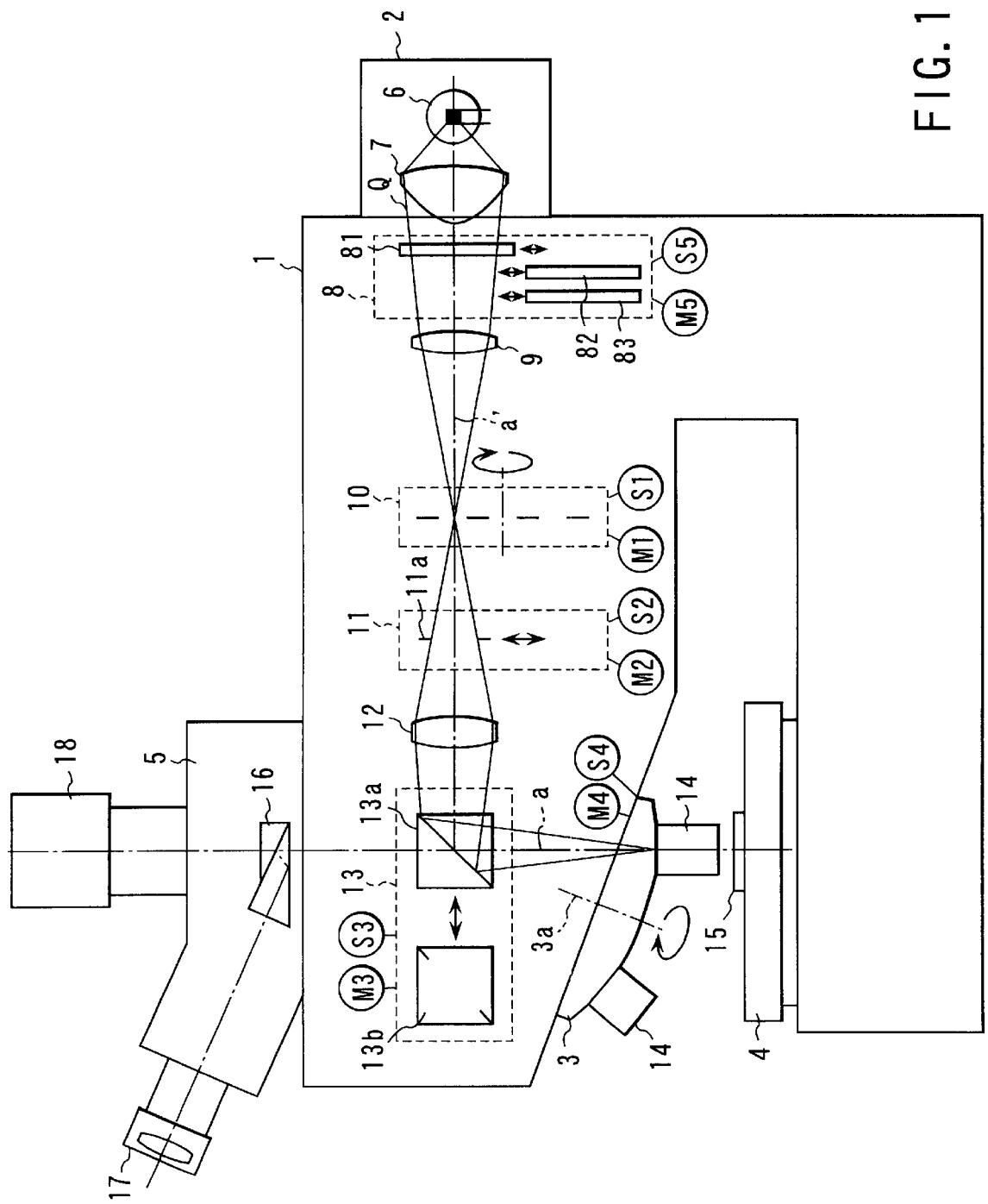
FIG. 1 is a view showing the structure of a microscope to which an illumination apparatus according to the present embodiment.

FIG. 1 is a view showing the structure of a microscope to which an illumination apparatus according to the present embodiment. In the illumination (incident illumination, projection illumination) observation microscope shown in FIG. 1, a microscope body 1 comprises a light source section 2, a motorized nosepiece (revolving nosepiece, revolver) 3, a stage 4, and an observation tube 5.

A collector lens 7, a light reduction unit 8, a relay lens 9, an aperture diaphragm unit 10, a field diaphragm unit 11, a relay lens 12, and an half-mirror unit 13 are provided on the light passage of illumination light Q radiated from an illumination light source 6 in the light source section 2 (which will be referred to as illumination light).

A plurality of objective lenses 14 can be attached to the motorized nosepiece 3 provided below the half-mirror unit 13, and the revolving nosepiece 3 is electrically rotated about the rotation shaft 3a thereby to selectively set a desired lens 14 on the optical axis a. A stage 4 is provided below the objective lens 14 on the optical axis a, and a sample 15 is mounted on the stage 4. On the light passage of an observed image which is reflection light from the sample 15, an objective lens 14 is provided, and also, a prism 16 of an observation tube 5 is provided with an half mirror 13a or 13b inserted therebetween. An eyepiece lens 17 and a television observation apparatus 18 are provided respectively in the branch directions of the prism 16.

The aperture diaphragm unit 10 comprises a motor (aperture diaphragm motor) M1 and a sensor S1. The aperture diaphragm unit 10 electrically performs rotation switching among a plurality of aperture diaphragms respectively having different diameters as will be described later (or one hole may be provided in the aperture diaphragm unit 10 and the diameter of the hole may be electrically switched variably by an iris diaphragm (a plurality of diaphragm wings)). The field diaphragm unit 11 comprises a motor (field-diaphragm motor) M2 and a sensor S2. The field diaphragm unit 11 inserts and pulls out the field diaphragm 11a onto and from the light passage of the illumination light Q in accordance with the bright field observation and the dark field observation, as will be described later.

The half-mirror unit 13 comprises a motor (half-mirror motor) M3 and a sensor S3. The half-mirror unit 13 has an half-mirror 13a for the bright field illumination and an half-mirror 13b which reflects ring-like illumination light and is used the dark field illumination. By electrically rotating the mirrors to switch them in accordance with an observation method (e.g., the bright field illumination observation method and the dark field illumination observation method).

Among these mirrors, the half-mirror 13a for the bright field illumination reflects the illumination light Q and thereby forms an image of the illumination light source 6 at the pupil position of the objective lens 14. Thus, Koehler illumination is achieved. In addition, the half-mirror 13b for the dark field illumination reflects only the light near the outer circumference of the light flux of the illumination light Q, and guides the light flux to a ring-like dark field illumination passage of the objective lenses 14 attached to the motorized nosepiece 3.

The motorized nosepiece 3 comprises a motor (revolving nosepiece motor (revolver motor)) M4 and a sensor S4. As described above, the motorized nosepiece 3 electrically rotates and moves a selected objective lens onto the optical axis a. The light reduction unit 8 comprises a plurality of ND filters (Neutral density filters) 81 to 83, a motor M5, and a sensor S5. The light reduction unit 8 is capable of adjusting light by electrically inserting and pulling out a plurality of ND filters 81 to 83 on the light passage for the illumination light Q in accordance with the bright field illumination and dark field illumination respectively. In addition, the illumination light source 6 is capable of adjusting light by means of voltage control using the light adjusting circuit which will be described later.

Figure 2A:
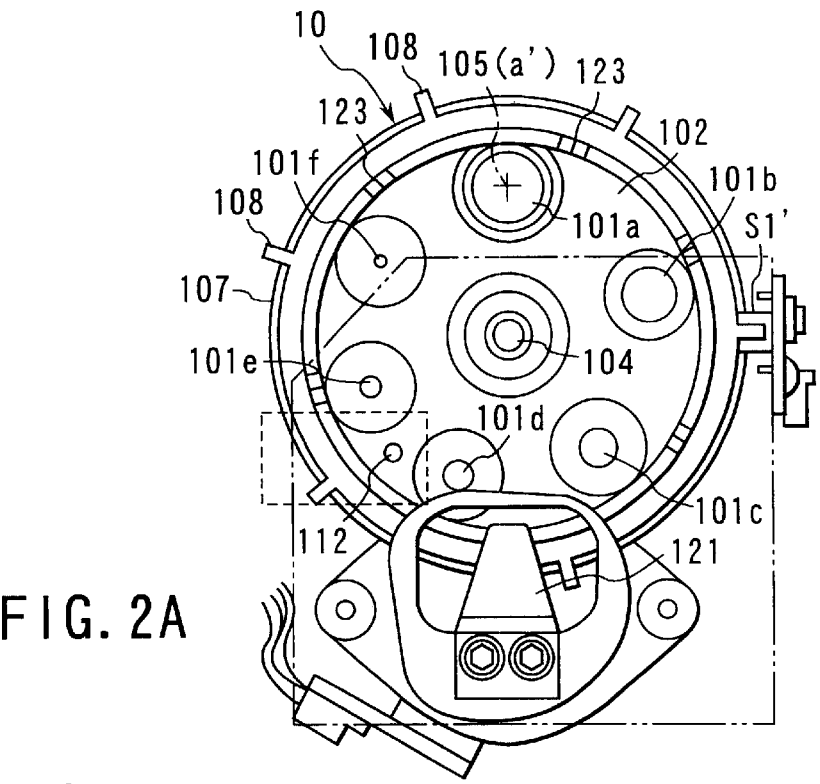
FIGS. 2A to 2C are views showing the detailed structure of the aperture diaphragm unit in the present microscope.
Figure 2B:
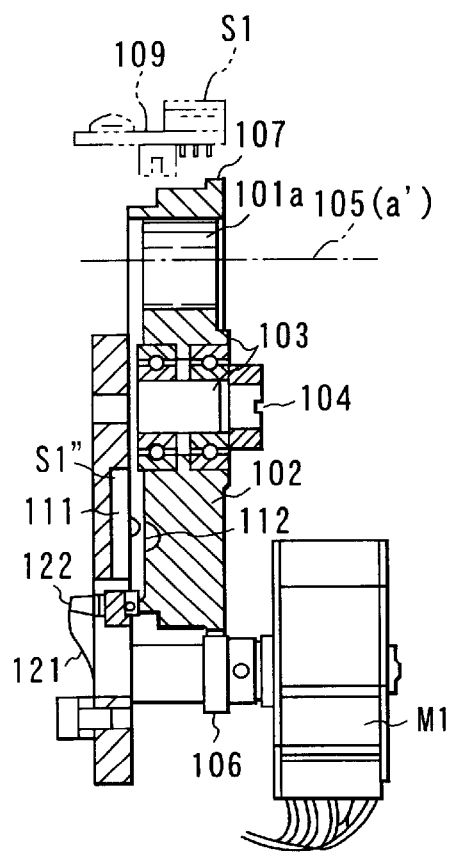
Figure 2C:
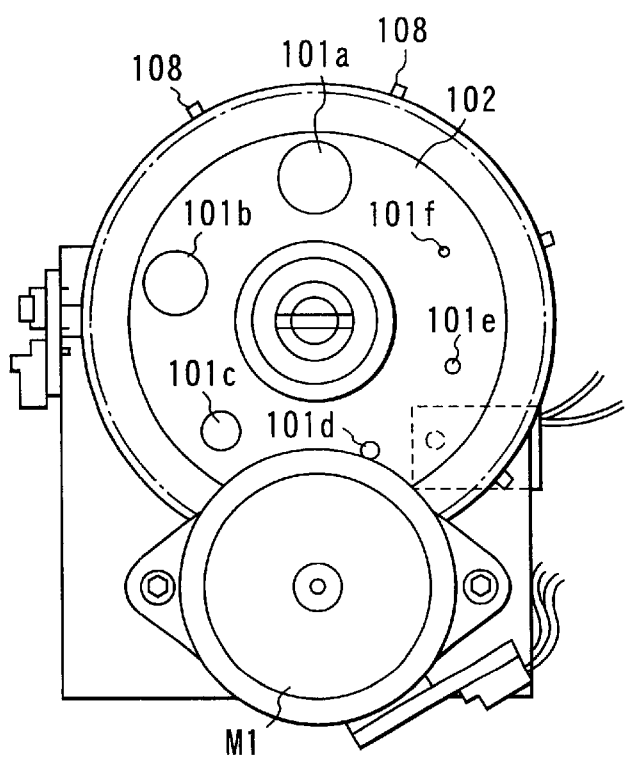

FIGS. 2A to 2C are views showing the detailed structure of the aperture diaphragm unit 10 in the present microscope. FIG. 2A is a view in a direction from the illumination light source 6. FIG. 2B is a side view, and FIG. 2C is a view in a direction from the field diaphragm unit 11. As for the sensor substrate 109 shown in FIG. 2B, a view from another direction is drawn with a two-dot chain line to show the side view of the sensor S1'.

The aperture diaphragm unit 10 comprises an aperture diaphragm turret 102 in which aperture diaphragms 101a to 101f respectively having different diameters are formed. This aperture diaphragm turret 102 rotates about the rotation shaft 104 by a bearing 103, to selectively set such one of the aperture diaphragms 101a to 101f that has a desired diameter, on the optical axis 105 (a') of the illumination light Q.

In many cases, these aperture diaphragms are of the type which continuously change their own aperture diameters by means of an iris diaphragm (a plurality of diaphragm wings). In contrast, the aperture diaphragm unit 10 switches, step by step, a plurality of fixed diaphragms having different diameters. The iris diaphragm involve unreliableness concerning the durability caused by repetitive operation and the possibility of dusting characteristics. However, fixed diaphragms achieve good preciseness and reproductivity, as diaphragm diameters, based on quantitative evaluation of an observed image. That is, a continuous change by means of iris diaphragm involves difficulties in preciseness and reproductivity of the diameters, but fixed diaphragms cause such difficulties.

The aperture diaphragms 101a to 101f are formed such that the hole diameter gradually decreases from the aperture diaphragm 101a having the maximum diameter (optically released). One of the aperture diaphragms is selected in accordance with the pupil diameter of the objective lens 14, and the positions of the diaphragms are stored in a control system. Note that the pupil diameter of the objective lens 14 generally decreases as the magnification of the objective lens increases.

In addition, the turret 102 of the aperture diaphragm is controlled so as to select the aperture diaphragm 101a having the maximum diameter during dark field observation, regardless of which objective lens 14 is positioned on the light passage, and so as to select such one of the aperture diaphragms 101a to 101f that has a diameter suitable for the objective lens 14 positioned on the light passage, during bright field observation.

The rotation shaft of the motor M1 is provided with a pinion 106, and this pinion 106 is engaged with a gear 107 provided near the outer circumference of the turret 102.

In the following, explanation will be made of electric detection and switching of an origin for switching selection among the aperture diaphragms 101a to 101f. A magnet 112 is embedded and bonded at a space between the aperture diaphragms 101d and 101e of the aperture diaphragm turret 102. A hall element substrate 111 is provided in the fixed side of the aperture diaphragm unit 10, and a sensor S1" constructed by a hall element is used. When the aperture diaphragm 101a enters in the optical axis 105(a'), the magnet 112 of the aperture diaphragm turret 102 just overlaps the position of the hall element substrate 111, and this state is recognized as an origin.

When the power of the present microscope is turned on, the aperture diaphragm unit 10 rotates the turret 102 and matches the positions of the magnet 112 and the hall element substrate 111 with each other, thereby to recognize that the aperture diaphragm 101a is at the position of the optical axis 105(a'). In addition, a plurality of sensor plate projecting portions 108 corresponding in number to the aperture diaphragms 101a to 101f are provided on the outermost circumference of the aperture diaphragm turret 102. Since the sensor substrate 109 detects each sensor plate projecting portion 108, the aperture diaphragms 101a to 101f are detected to be near the optical axis 105(a'). A sensor S1' such as a transmissible type photo interrupter or the like is used as the sensor substrate 109.

Also, in order to the stop position precision of the aperture diaphragm turret 102, a click mechanism based on a plate spring 121 and a roller 122 is provided in the fixed side of the aperture diaphragm unit 10. A plurality of click grooves 123 are provided at the outer circumferential portion in one side surface of the aperture diaphragm turret 102, so as to correspond to diaphragm holes, respectively. The roller 122 energized by the plate spring 121 falls into the clock groove 123, thereby positioning the aperture diaphragm turret 102.

Therefore, the turret 102 rotates when a predetermined number of pulses are sent to the stepping motor M1, and the stepping motor M1 is stopped when the sensor plate projecting portion 108 is detected by the sensor S1'. In this manner, the diaphragm holes 101a to 101f can be positioned on the optical axis 105(a'). At this time, from the origin determined when the power turned on (i.e., from the situation in which the aperture diaphragm 101a exists on the optical axis 105(a')), one of the aperture diaphragms 101a to 101f that is suitable for an observation method or an objective lens 14 is selected by controlling how many pulses should be sent in which direction, or how many (times) sensor plate projecting portions 108 are detected by the sensor S1' in which direction.

Figure 3:
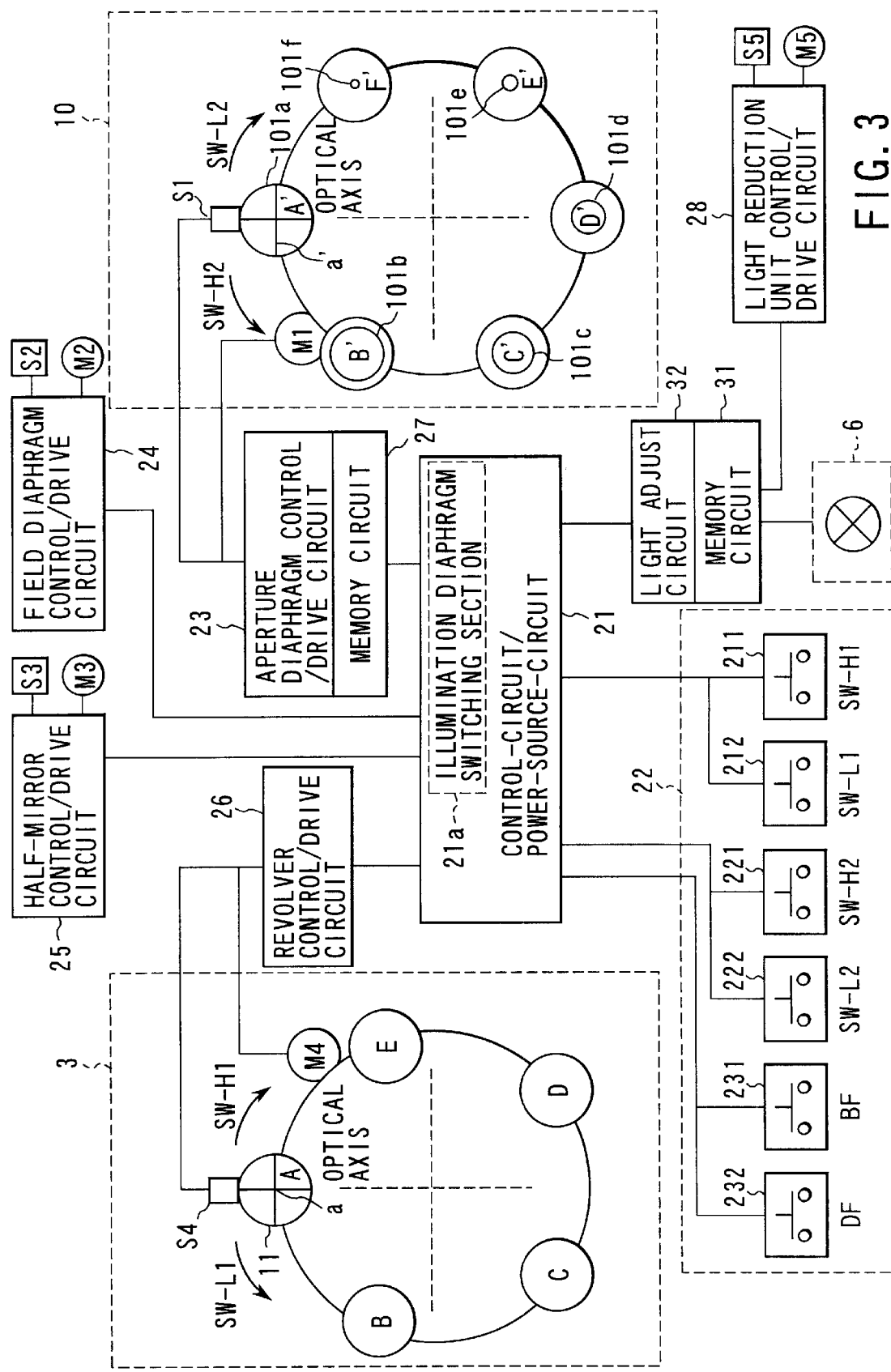
FIG. 3 is a block diagram showing an electric circuit of a control system in the present microscope and is also a conceptual view relating to switching of objective lenses and aperture diaphragms.

FIG. 3 is a block diagram showing an electric circuit of a control system in the present microscope and is also a conceptual view relating to switching of objective lenses and aperture diaphragms. In FIG. 3, those portions that are the same as those in FIGS. 1 and 2A to 2C are referred to as same reference symbols. As shown in FIG. 3, the control-circuit/power-source-circuit 21 is connected with the motor M1 and the sensor S1 through an aperture diaphragm control/drive circuit 23, with a motor M2 and a sensor S2 through a field diaphragm control/drive circuit 24, with a motor M3 and a sensor S3 through an half-mirror control/drive circuit 25, and with a motor M4 and a sensor S4 through a revolving nosepiece control/drive circuit (a revolver control/drive circuit) 26. Further, the control-circuit/power-source-circuit 21 is connected with a light reduction unit control/drive circuit 28 and an illumination light source 6 through a light adjust circuit 32 and a memory circuit 31. The light reduction unit control/drive circuit 28 is connected with a motor M5 and a sensor S5. The control/drive circuits 23, 24, 25, 26, and 28 are each controlled by each command issued from the control-circuit/power-source-circuit 21, and respectively drive and control the motors M1 to M5 and the sensors S1 to S5.

In addition, the control-circuit/power-source-circuit 21 is connected with an operation section 22. By operating a switch and the like in the operation section 22, a corresponding operation instruction is sent to the motors M1 to M5 through the control-circuit/power-source-circuit 21 and the control/drive circuits, respectively. In this manner, it is possible to freely operate the motors M1 to M5 by means of instructions from the operation section 22. The operation section 22 comprises revolving nosepiece switches (revolver switches)(SW-H1, L1) 211 and 212, aperture diaphragm switches (SW-H2, L2) 221 and 222, a bright field switch (BF) 231, and a dark field switch (DF) 232.

The revolving nosepiece switches (SW-H1, L1) 211 and 212 are used to switch one another of the objective lenses 14 on the optical axis a by rotating the motorized nosepiece 3 in the regular and inverse directions. The aperture diaphragm switches (SW-H2, L2) 221 and 222 are used to switch one another of the aperture diaphragms 101a to 101f on the optical axis a' by rotating the aperture diaphragm turret 102 of the aperture diaphragm unit 10 in the regular and inverse directions. The bright field switch (BF) 231 is used to switch and shift the half-mirror 13a for bright filed illumination onto the optical axes a and a' by selecting and instructing the bright field observation method. The dark field switch (DF) 232 is used to switch and shift the half-mirror 13b for dark field illumination onto the optical axes a and a' by selecting and instructing the dark field illumination observation method.

The aperture diaphragm control/drive circuit 23 drives the motor (stepping motor) M1 thereby to rotate the aperture diaphragm turret 102 of the aperture diaphragm unit 10. The circuit 23 also receives the rotation position of the aperture diaphragm turret 102 detected by the sensor S1 (S1', S1"), and reads out information concerning the observation methods previously stored in the memory circuit 27 and information concerning the one of the aperture diaphragms 101a to 101f which having a diameter matched with the magnification of the objective lens 14 to be selected. Further, the circuit 23 makes the one of the aperture diaphragm 101a to 101f be arranged on the light passage 105 for the illumination light Q (i.e., on the optical axis a'). At this time, the diameter of the aperture diaphragm currently existing on the optical axis a' and the diameter (hole position) of a target aperture diaphragm to be positioned onto the optical axis a' can be recognized by the sensor S1.

The field diaphragm control/drive circuit 28 drives the motor M2 thereby to insert and pull out the field diaphragm 11a of the field diaphragm unit 11 into and from the light passage for the illumination light Q. That is, the circuit 28 receives an insertion/pulled-out status of the field diaphragm 11a detected by the sensor S2, and inserts the field diaphragm 11a into the light passage for the illumination light Q when bright field observation is carried out, and pulls out the field diaphragm 11a from the light passage for the illumination light Q when dark field observation is carried out.

The half-mirror control/drive circuit 25 drives the motor M3 thereby to insert/pull out the half-mirror 13a or 13b into/from the light passage for the illumination light Q. That is, the circuit 25 receives an insertion/pulled-out status of the half-mirror 13a or 13b detected by the sensor S3, and inserts the half-mirror 13a into the light passage for the illumination light Q when field observation is carried out and the half-mirror 13b into the light passage for the illumination light Q when dark field observation is carried out.

The revolving nosepiece control/drive circuit 26 drives the motor M4 thereby to rotate the motorized nosepiece 3 in the clockwise or anti-clockwise direction. This circuit 26 also receives the position of the objective lens 14 detected by the sensor S4, and positions a desired objective lens 14 onto the optical axis a. At this time, the magnifications (hole positions) of the objective lens currently existing on the optical axis a' and a target objective lens to be positioned onto the optical axis a' can be recognized. Note that information concerning the magnifications of the objective lenses respectively equipped in the holes of the motorized nosepieces 3 is stored, and therefore, based on the position of a hole detected by the sensor S4, the revolving nosepiece control/drive circuit 26 is capable of recognizing the objective lens 14 for the hole.

The light reduction unit control/drive circuit 28 drives the motor M5 thereby to insert/pull out the ND filters 81 to 83 of the light reduction unit 8 into/from the light passage for the illumination light Q. That is, the circuit 28 receives an insertion/pulled-out status of each of the ND filters 81 to 83 detected by the sensor S5 and inserts/pulls out the ND filters 81 to 83 in accordance with the bright field observation and the dark field observation, thereby to adjust the light amount of the illumination light Q.

Also, the control-circuit/power-source-circuit 21 has an illumination diaphragm switching section 21a. When an observation method or an objective lens 14 is switched to another one, the illumination diaphragm switching section 21a drives the motor M1 as follows before the half-mirror unit 13 or the motorized nosepiece 3 is operated, thereby to rotate the aperture diaphragm turret 102 by a predetermined angle. The illumination light Q is shielded by a light shielding portion of the aperture diaphragm turret 102. Further, after the completion of switching of the observation method or the objective lens, the illumination diaphragm switching section 21a drives the aperture diaphragm turret 102 so as the currently used aperture diaphragm to one of the aperture diaphragms 101a to 101f that has a diameter corresponding to the observation method or the objective lens 14.

In FIG. 3, among the plurality of objective lenses attached to the motorized nosepiece 3, the lens A has the lowest magnification and the magnifications are arranged so as to increase gradually in the order of A, B, C, D, and E. When the revolving nosepiece switch (SW-H1) 211 is operated, the objective lens existing on the optical axis a is switched to another one which has a higher magnification. If the objective lens E exists on the optical axis a, the lens is switched to the objective lens A. When the revolving nosepiece switch (SW-L1) 212 is-operated, the objective lens existing on the optical axis a is switched to another one which has a lower magnification. If the objective lens A exists on the optical axis a, the lens is switched to the objective lens E.

In addition, among a plurality of holes provided in the aperture diaphragm unit 10, the hole A' has the largest diameter, and the diameters are arranged so as to decrease in the order of A', B', C', D', E', F'. When the aperture diaphragm switch (SW-H2) 221 is operated, the hole currently existing on the optical axis a' is switched to another hole which has a larger diameter. If the hole A' exists on the optical axis a', this hole is switched to the hole F'. When the aperture diaphragm switch (SW-L2) 222 is operated, the hole currently existing on the optical axis a' is switched to another hole which has a smaller diameter. If the hole E' exists on the optical axis a', this hole is switched to the hole A'.

In the following, explanation will be made of examples of operation of a microscope constructed as described above.

Note that the operation examples explained below are not independent from each other but can be practiced in combination with each other.

First and second operation examples improve prevention of dazzling when switching an objective lens by shielding stray light while switching an objective lens in the dark field observation.

Third and fourth operation examples improve prevention of dazzling when switching an objective lens by removing unnecessary increase of the illumination light amount while switching an objective lens in the bright field observation.

Fifth and Sixth operation examples improve prevention of dazzling when switching an aperture diaphragm by preventing unnatural changes of the illumination light amount while switching an aperture diaphragm in the bright field observation. The sixth operation example is also an example by which unnecessary increase of the illumination light amount.

A seventh operation example improves prevention of dazzling when switching an observation method by removing unnecessary increase of the illumination light amount while switching between the bright and dark field observations is carried out.

Accordingly, it is possible to provide a microscope capable of preventing dazzling in any of the cases of the bright field observation, dark field observation, and switching between these observation methods, by applying the first or second operation example to the operation of switching an objective lens during the dark field observation, by applying the third or (and) fourth operation example to the operation of switching an objective lens during the bright field observation, by applying the fifth or sixth operation example to the operation of switching an aperture diaphragm during the bright field observation, and by applying the seventh operation example to the operation of performing switching between the bright and dark field observation methods.

At first, as a first operation example, an operation example during observation based on the bright field illumination observation method will be explained now. In this case, in the half-mirror unit 13, a half-mirror 13a for the bright field observation is positioned on the optical axes a and a', in the field diaphragm unit 11, the field diaphragm 11a is inserted in the light passage for the illumination light Q, and in the light reduction unit 8, ND filters 81 to 83 are all pulled out of the light passage.

Suppose that an operator operates the revolving nosepiece switches 211 and 212 through the operation section 22 to makes a switching selection of the objective lens 14, in the bright field observation. The control-circuit/power-source-circuit 21 issues a command for switching the aperture diaphragm existing on the optical axis a', to one of the aperture diaphragms 101a to 101f that matches with the objective lens 14 selected by the operation section 22 and stored in the in the memory circuit 27.

Next, the control-circuit/power-source-circuit 21 issues a rotation command for the motorized nosepiece 3 to the revolving nosepiece control/drive circuit 26. Therefore, the aperture diaphragm turret 102 rotates before the motorized nosepiece 3 rotates, and the one of the aperture diaphragms 101a to 101f that matches with the objective lens 14 selected by the operation section 22 is automatically positioned on the light passage for the illumination light Q, i.e., on the optical axis a'. Subsequently, the motorized nosepiece 3 rotates and the objective lens 14 selected by the operation section 22 is automatically positioned on the optical axis a.

In this case, for example, the aperture diaphragm 101b is selected as the aperture diaphragm that matches with the objective lens 14 having the lowest magnification. As the magnification of the objective lens 14 becomes lower, the diameter of the selected aperture diaphragm decreases. The aperture diaphragm 101f having the lowest diameter is selected as the aperture diaphragm that matches with the objective lens 14 having the highest magnification.

Next, explanation will be made based on the dark field illumination observation method. In this case, in the half-mirror unit 13, the half-mirror 13b for the dark field observation is positioned on the optical axes a and a', and in the field diaphragm unit 11, the field diaphragm 11a is inserted in the light passage for the illumination light Q. Note that all the ND filters 81 to 83 are pulled out of the light passage.

Figure 4:
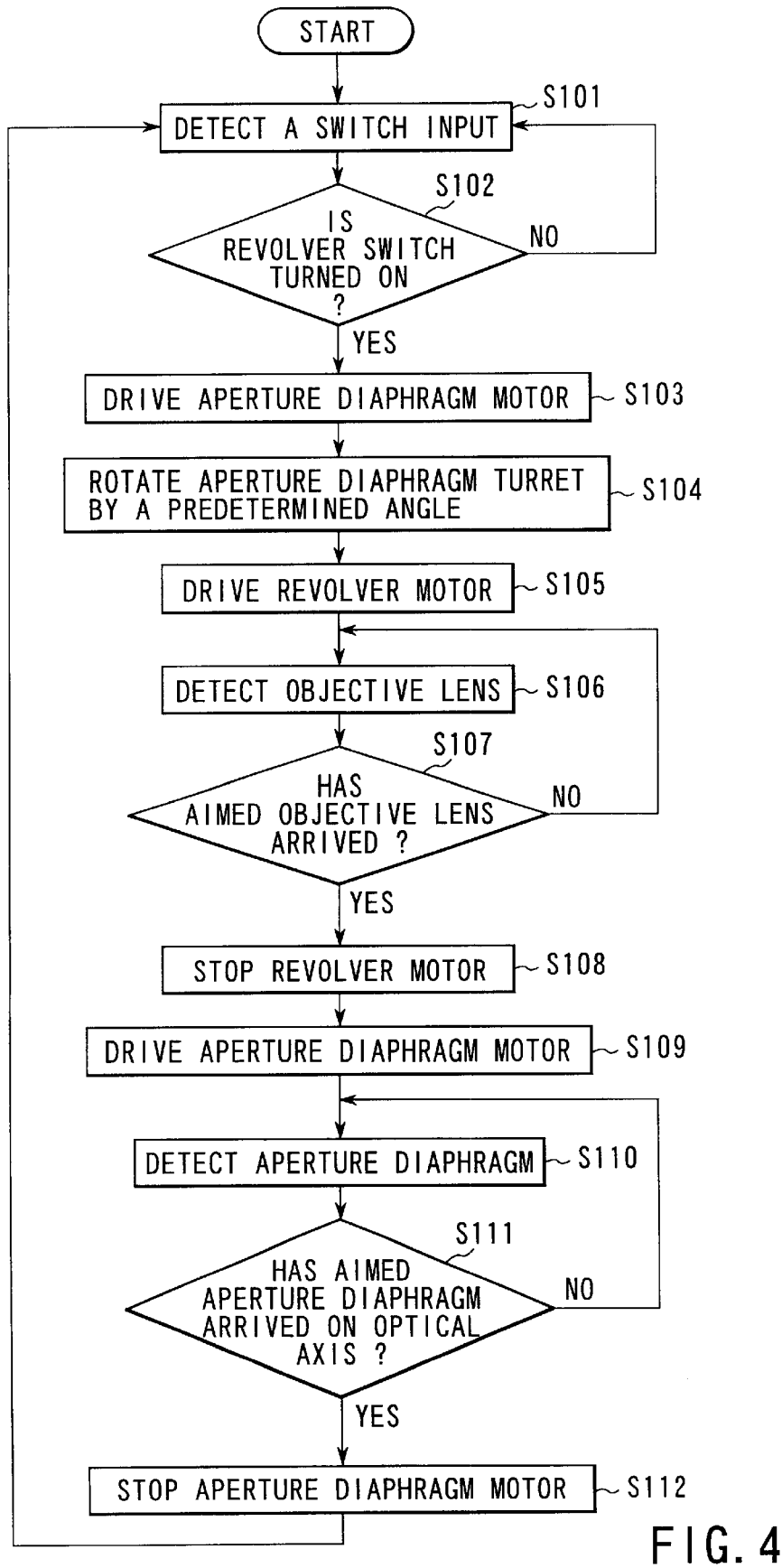
FIG. 4 is a flowchart showing an operation sequence for switching of the objective lens in the dark field observation using the present microscope.

FIG. 4 is a flowchart showing an operation sequence for switching of the objective lens in the dark field observation using the present microscope.

The control-circuit/power-source-circuit 21 detects an input from the operation section 22 in the step S101, and recognizes that either the revolving nosepiece switch 211 or 213 is turned ON, in the step S102. Then, in the step S103, the illumination diaphragm switching section 21a issues a command to the aperture diaphragm control/drive circuit 23, thereby to send a predetermined pulse to the motor M1 so that the motor (aperture diaphragm motor) M1 is driven. Further, in the step S104, the aperture diaphragm turret 102 is rotated by a predetermined angle θ in the clockwise or anti-clockwise direction as the motor M1 is driven. In this manner, the illumination light Q is shielded by the light shielding portion of the aperture diaphragm turret 102 which will be described later.

Next, in the step S105, the control-circuit/power-source-circuit 21 drives the motor (revolving nosepiece motor) M4 by the revolving nosepiece control/drive circuit 26, thereby to rotate the motorized nosepiece 3. The objective lens positioned on the optical axis a is detected in the step S106.

This detection is continuously carried out until a target objective lens arrives on the optical axis a. Further, when the target objective lens arrives on the optical axis a in the step S107, the motor M4 is stopped in the step S108.

Next, in the step S109, the control-circuit/power-source-circuit 21 drives the motor M1 by the aperture diaphragm control/drive circuit 23, thereby to rotate the aperture diaphragm turret 102. In the step S110, the aperture diaphragm positioned on the optical axis a', is detected. This detection is continuously carried out until the aimed aperture diaphragm 101a having the largest diameter arrives on the optical axis a' in the step S111. Further, when the aimed aperture diaphragm arrives on the optical axis a' in the step S111, the motor M1 is stopped in the step S112.

As described above, in case of the dark field observation, a switching selection of the objective lens 14 is carried out by the operation section 22, and then, the illumination switching section 21a of the control-circuit/power-source-circuit 21 issues a command to the aperture diaphragm control/drive circuit 23 so as to send a predetermined pulse so that the motor M1 is driven. In this manner, the aperture diaphragm turret 102 is rotated by a predetermined angle θ in the clockwise or anti-clockwise direction, so that the illumination light Q is shielded by the light shielding portion of the aperture diaphragm unit 102 which will be described later.

Next, the control-circuit/power-source-circuit 21 issues a rotation command for the motorized nosepiece 3 to the revolving nosepiece control/drive circuit 26, so that an aimed objective lens 14 selected by the operation section 22 is positioned on the optical axis a. Subsequently, the control-circuit/power-source-circuit 21 issues, to the aperture diaphragm control/drive circuit 23, a command for switching the currently used aperture diaphragm to such one of the aperture diaphragms 101a having the largest diameter that matches with the dark field observation and that is stored in the memory circuit 27. The aperture diaphragm turret 102 is then rotated again so as to position the aperture diaphragm 101a having the largest diameter onto the optical axis a'. In this manner, in the normal dark field observation, the aperture diaphragm 101a having the largest diameter is positioned on the optical axis a'. However, this aperture diaphragm 101a is optically released and passes all the flux of the illumination light Q. In other words, there is no illumination light Q which exceeds the range of the flux.

Figure 5A:
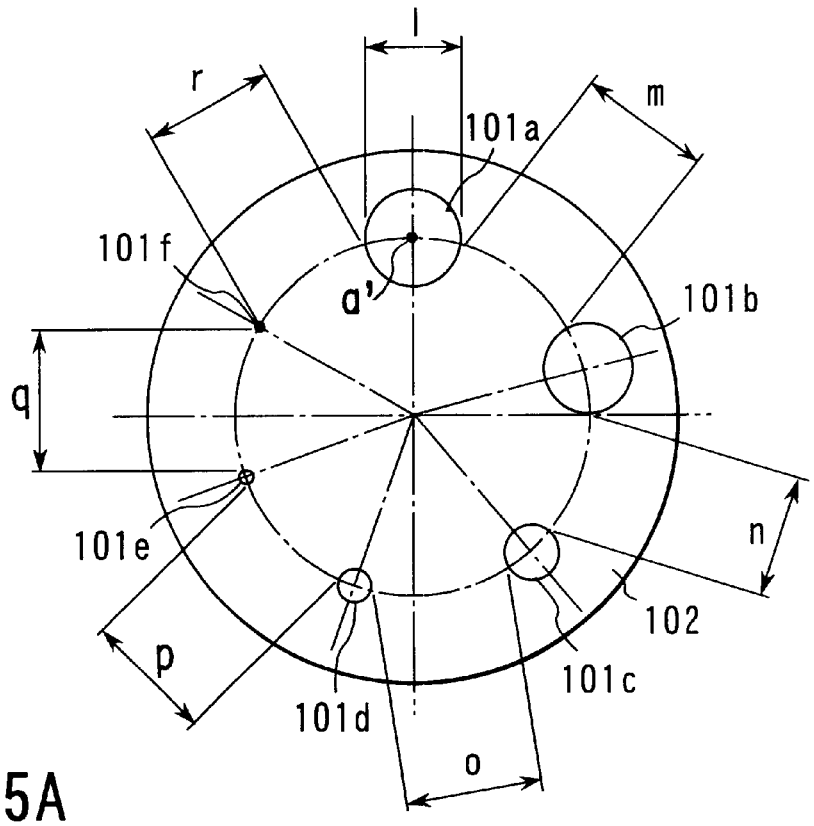
FIGS. 5A and 5B are views showing operation of the aperture diaphragm turret during the dark field observation in the present microscope.
Figure 5B:
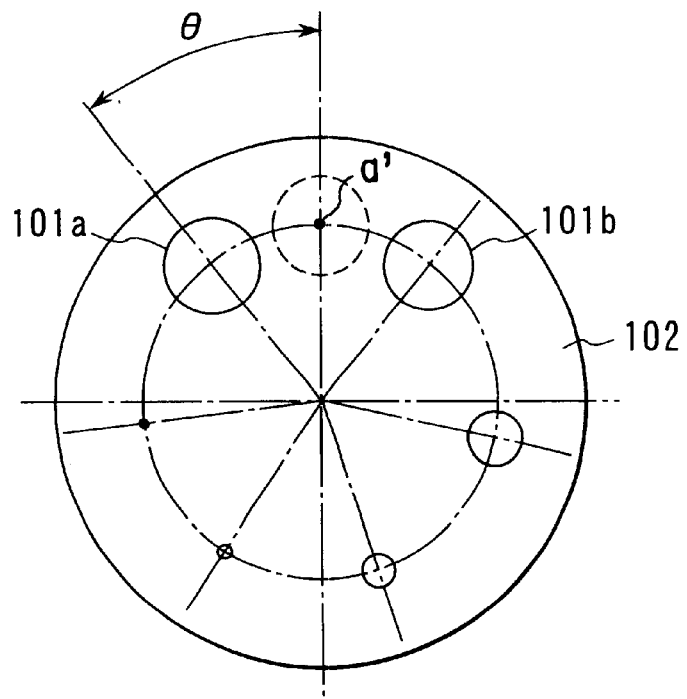

FIGS. 5A and 5B are views showing operation of the aperture diaphragm turret 102 during the dark field observation in the present microscope. As shown in FIGS. 5A and 5B, the peripheries in both sides of the aperture diaphragm 101a having the largest diameter, extending up to both the adjacent aperture diaphragms 101b and 101f are light shielding portions. The distances m and r to the aperture diaphragms 101b and 101f are longer than the diameter l of the aperture diaphragm 101a. Therefore, for example, if the aperture diaphragm turret 102 is stopped at the time point when it is rotated by a predetermined angle θ as shown in FIG. 5B, the optical axis a' of the illumination light Q is positioned at the center portions of the distances m and r from the aperture diaphragm 101a to the aperture diaphragms 101b and 101f, so that the illumination light Q is perfectly shielded.

Figure 6:
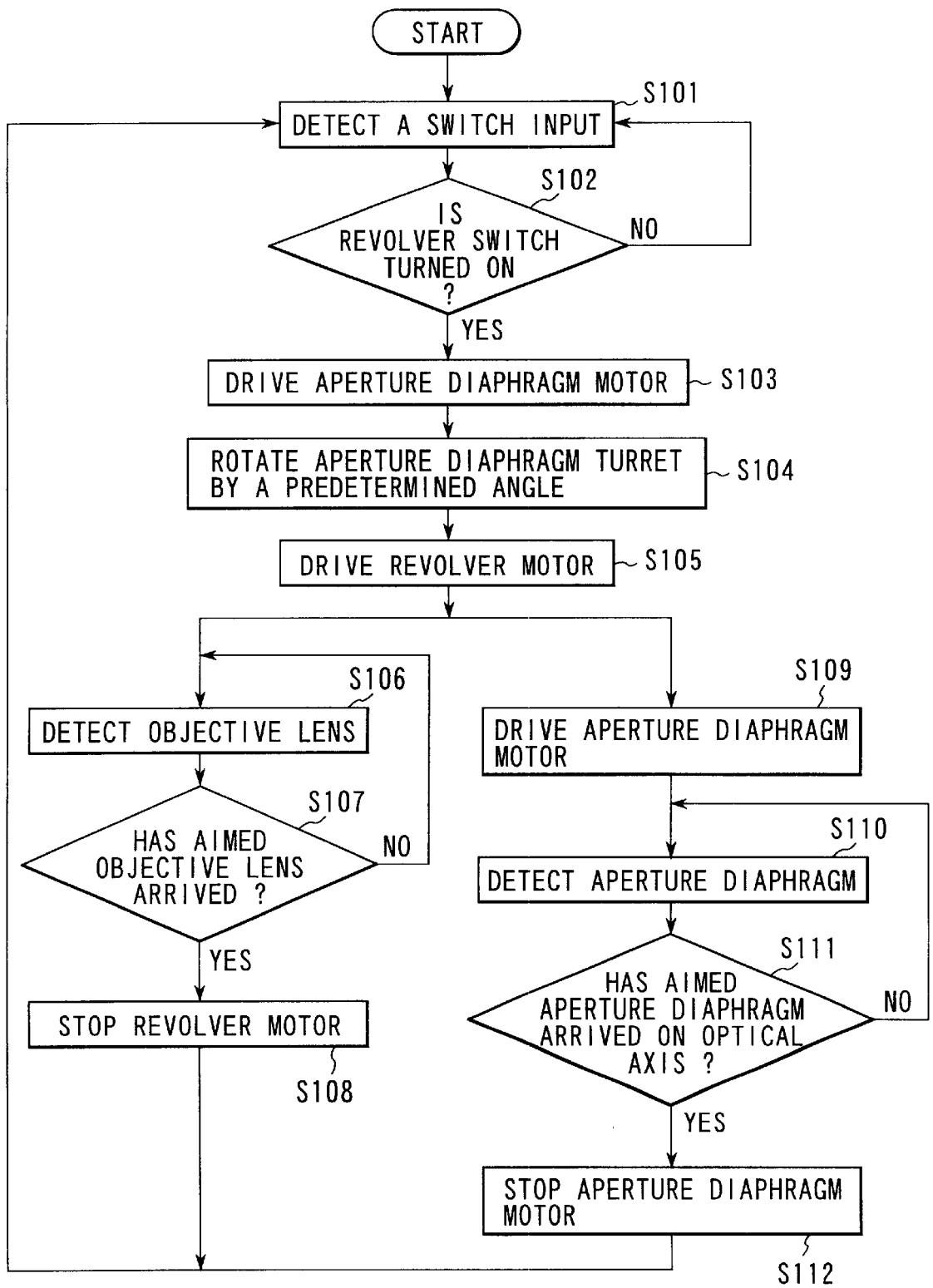
FIG. 6 is a flowchart showing a modification example of the operation sequence during the dark field observation in the present microscope, shown in FIG. 4.

FIG. 6 is a flowchart showing a modification example of the operation sequence during the dark field observation in the present microscope, shown in FIG. 4. In FIG. 6, the same steps as those in FIG. 4 are denoted by same reference symbols. In the operation sequence shown in FIG. 6, the aperture diaphragm turret 102 in the step S104 is rotated by a predetermined d angle θ in the clockwise or anti-clockwise direction. Next, in the step S105, rotation of the motorized nosepiece 3 is started. Thereafter, the operation of the steps S106 to S108 and the operation of the steps S109 to S112 are progressed simultaneously. That is, switching of the objective lens 14 and switching of the aperture diaphragm are carried out in parallel. Also, in this case, the illumination light Q is perfectly shielded before the motorized nosepiece 3 is rotated.

In the operation examples shown in FIGS. 4 and 6, the aperture diaphragm turret 102 is rotated by a predetermined angle θ before the motorized nosepiece 3 is rotated, and the optical axis b of the illumination light Q is positioned at the center portions of the distances m and q to the aperture diaphragms 101*b* and 101*f*. The illumination light Q is perfectly shielded. In this case, if the distances m and q to the aperture diaphragms 101*b* and 101*f* are formed to be relatively large, the angle by which the aperture diaphragm turret 102 is rotated need not be very accurate in relation to the predetermined angle θ. In addition, control of the motor M1 may be carried out as open control based on pulse management without using the sensor S1.

In the operation example, when switching the objective lens 14 in the dark field observation, the aperture diaphragm turret 102 is rotated by a predetermined angle θ before operating the motorized nosepiece 3, and the illumination light Q is shielded by the shielding portion of the aperture diaphragm turret 102. Thereafter, after completion of switching of the objective lens 14, the aperture diaphragm is switched to the aperture diaphragm 101*a* having the largest diameter corresponding to the objective lens 14. As a result, the turret 102 is capable of not only switching the objective lens 14 during the bright field observation as in the operation example but also preventing stray light during an interval in which the objective lens 18 is switched in the dark field observation as in the second operation example. In this prevention of stray light, the aperture diaphragm turret 102 which has already been used need only be rotated by a predetermined angle θ, and therefore, it is not necessary to equip a specialized shutter mechanism or a special component. Further, it is not necessary to reduce light of the illumination light source 6 itself.

In addition, since the aperture diaphragms 101*a* to 101*f* are not wing type diaphragms, sufficient durability can be maintained with respect to switching of the objective lens 14 in the bright field observation which is frequently used, so that the reliability can be improved.

Next, an operation example in the observation based on the dark field illumination observation method will be explained as a second operation example. In this case, in the half-mirror unit 13, the half-mirror 13*b* for dark field observation is positioned on the optical axes a and a', and in the field diaphragm unit 11, the field diaphragm 11*a* is displaced from the light passage for the illumination light Q. Note that the ND filters 81 to 83 are all pulled out of the light passage, in the light reduction unit 8.

As has been described above, the stray light caused by switching an objective lens during the dark field observation brings about depending on the rotation direction of the revolving nosepiece 301 shown in FIGS. 15A and 15B, and can be specified by the incidence direction of the illumination light 305 which enters into the observation light passage 307 of the objective lens 303. As a result of this, for example, if the revolving nosepiece 301 is rotated in the direction to the left side on the figures as shown in FIGS. 15A and 15B, the illumination light 305 in the left side in the figures is unfavorable. In view of this point, control for determining the rotation direction of the aperture diaphragm turret is carried out in the present third operation example in correspondence with the rotation direction of the motorized nosepiece 3.

Note that the illumination switching section 21*a* of the control-circuit/power-source-circuit 21 has a function of selecting the rotation direction of the aperture diaphragm turret 102 in accordance with the rotation direction of the motorized nosepiece 3 thereby to shield the illumination light Q.

Figure 7:
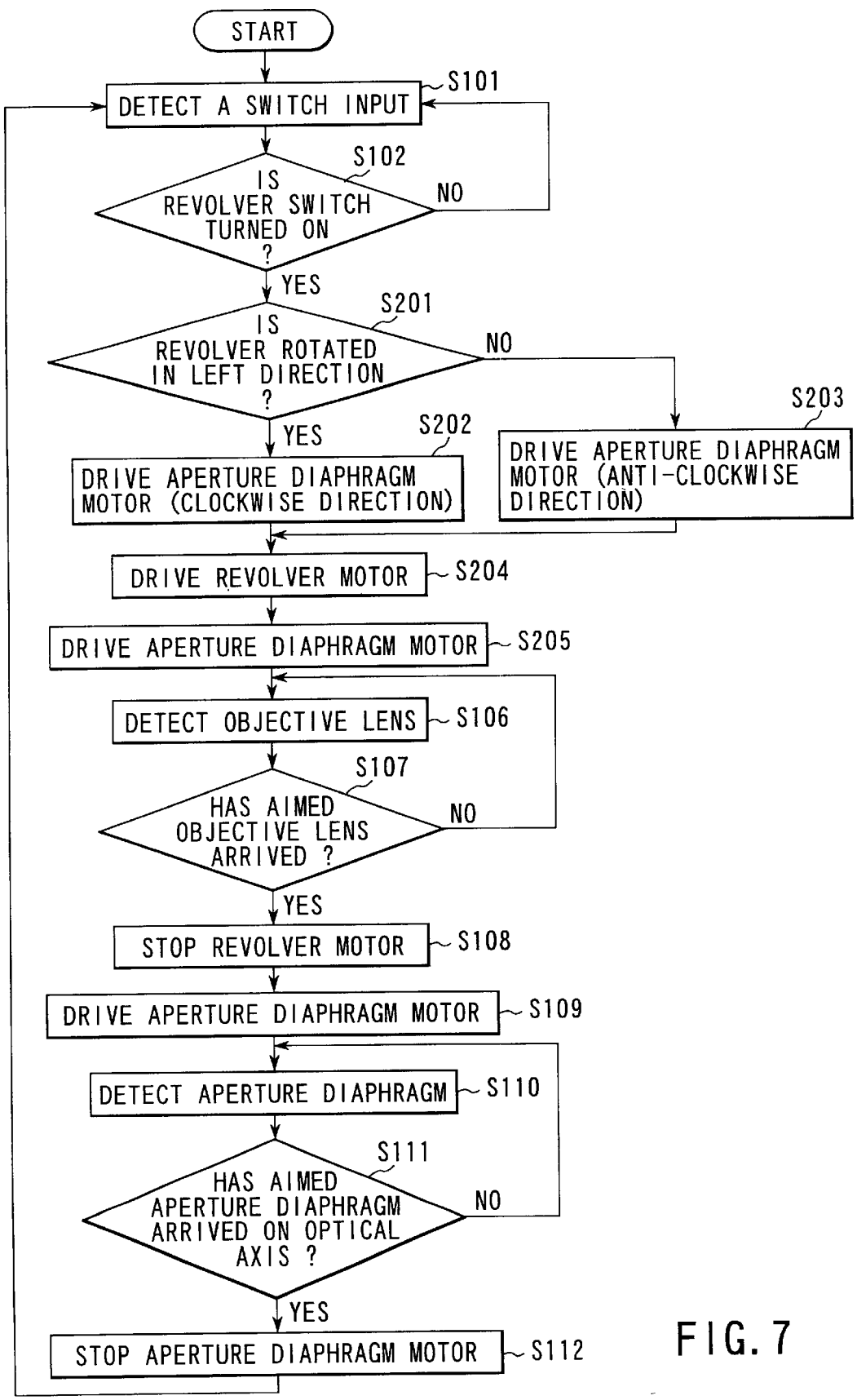
FIG. 7 is a flowchart showing an operation sequence for switching of the objective lens in the dark field observation using the present microscope.

FIG. 7 is a flowchart showing an operation sequence for switching of the objective lens in the dark field observation using the present microscope.

In FIG. 7, the same steps as those in FIG. 4 are denoted by same reference symbols. In the operation sequence shown in FIG. 7, the control-circuit/power-source-circuit 21 detects an input from the operation section 22 in the step S101, and recognizes that either the revolving nosepiece switch 211 or 212 is turned ON, in the step S102. Then, in the step S201, the circuit 21 detects whether the rotation direction of the motorized nosepiece 3 is in the left direction or the right direction, from the revolving nosepiece control/drive circuit 26.

Figure 8A:
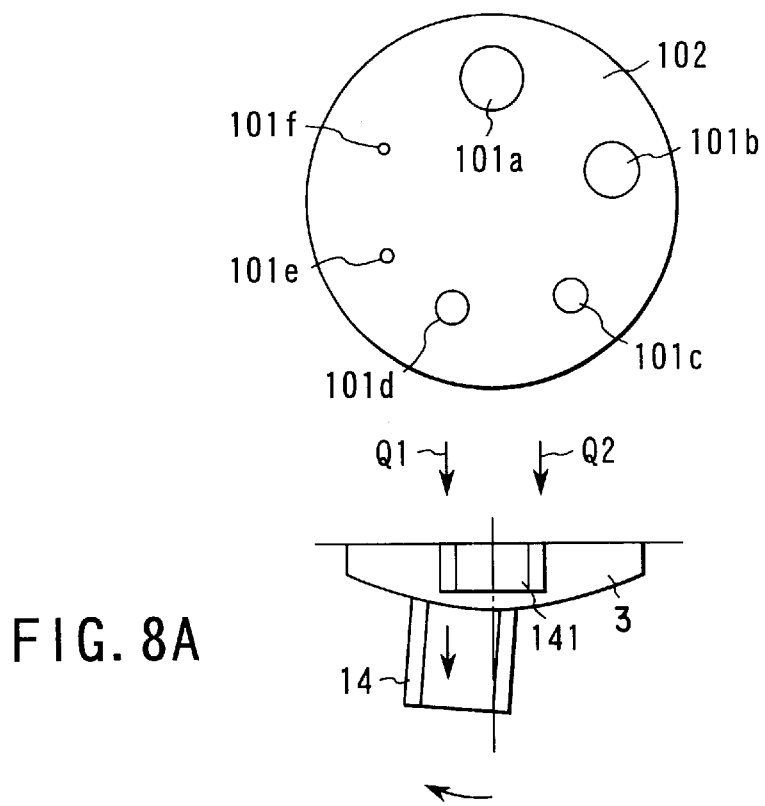
FIGS. 8A and 8B are schematic views showing the relationship between the aperture diaphragm turret and the motorized nosepiece.
Figure 8B:
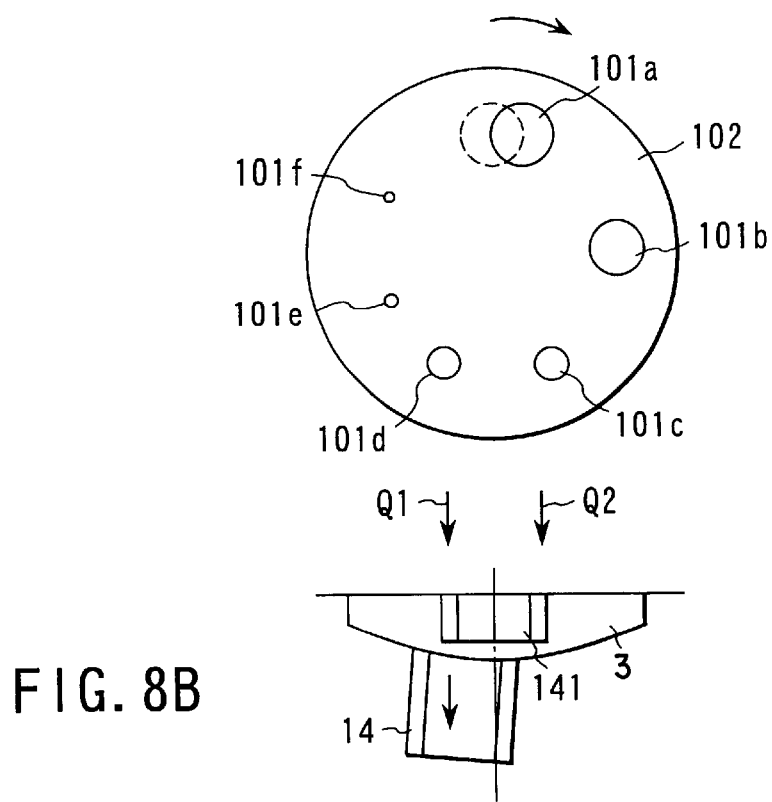

FIGS. 8A and 8B are schematic views showing the relationship between the aperture diaphragm turret 102 and the motorized nosepiece 3. As shown in FIG. 8A, while the motorized nosepiece 3 is being moved to the left side in the figure, stray light enters into the observation light passage 141 of the objective lens 14. Of the ring-like illumination light Q1 and ring-like illumination light Q2, the illumination light Q1 becomes stray light. Therefore, if the aperture diaphragm turret 102 is rotated so that the aperture diaphragm 101*a* positioned on the optical axis is moved to the right side, i.e., in a clockwise direction as shown in FIG. 8B and the illumination light is shielded from the left side (Q1 side), the light amount of the illumination light Q1 can be reduced rapidly.

If the rotation direction is detected to be the left direction, the illumination diaphragm switching section 21*a* of the control-circuit/power-source-circuit 21 issues a command to the aperture diaphragm control/drive circuit 23 so as to send a predetermined pulse to the motor (aperture diaphragm motor) M1 so that the motor M1 is driven thereby rotating the aperture diaphragm turret 102 in the clockwise direction. Otherwise, if the rotation direction is detected to be the right direction in the step S201, the illumination diaphragm switching section 21*a* issues a command to the aperture diaphragm control/drive circuit 23 so as to send a predetermined pulse to the motor M1 so that the motor M1 is driven thereby rotating the aperture diaphragm turret 102 in the anti-clockwise direction.

Further, in the step S204, the control-circuit/power-source-circuit 21 drives the motor (revolving nosepiece motor) M4 by the revolving nosepiece control/drive circuit 26 so that rotation of the motorized nosepiece 3 is started. Next, in the step S205, the illumination diaphragm switching section 21*a* issues a command to the aperture diaphragm control/drive circuit 23 so as to send a predetermined pulse signal to the motor M1 so that the motor (aperture diaphragm motor) M1 is continuously driven. By the driving of the motor M1, the aperture diaphragm turret 102 is subsequently rotated by a predetermined angle θ in the clockwise direction (in the case after the step S202) or the anti-clockwise direction (in the case after the step S203). In this manner, the illumination light Q is shielded by the light shielding portion of the aperture diaphragm turret 102. Thereafter, like in the case of FIG. 4, the operation from the step S106 is carried out.

In this structure, when an objective lens 14 is switched by the operation section 22 during the dark field observation, the illumination diaphragm switching section 21a of the control-circuit/power-source-circuit 21 issues a command to the aperture diaphragm control/drive circuit 23 so as to send a predetermined pulse signal to the motor M1 so that the motor M1 is driven. The aperture diaphragm turret 102 is thereby rotated in the rotation direction in accordance with the rotation direction of the motorized nosepiece 3. Further, at the time point when stray light is weakened sufficiently, the control-circuit/power-source-circuit 21 issues a command to the revolving nosepiece control/drive circuit 26 so as to start rotation of the motorized nosepiece 3. At this time, the timing at which rotation of the motorized nosepiece 3 is started and the rotation angle of the aperture diaphragm turret 102 is rotated are determined depending on the optical and mechanical designs and the common range of light reduction.

Next, the illumination diaphragm switching section 21a of the control-circuit/power-source-circuit 21 issues a command to the aperture diaphragm control/drive circuit 23 so as to send a predetermined pulse signal so that the motor M1 is continuously driven. As a result, the aperture diaphragm turret 102 is subsequently rotated to a predetermined angle θ, the illumination light Q is perfectly shielded by the light shielding portion of the aperture diaphragm unit 102.

Next, when the control-circuit/power-source-circuit 21 detects that an aimed objective lens 14 selected by the operation section 22 is positioned on the optical axis a, the control circuit 21 issues, to the aperture diaphragm control/drive circuit 23, a command for switching the aperture diaphragm to the aperture diaphragm 111a having the largest diameter that matches with the dark field observation stored in the memory circuit 27. The aperture diaphragm turret 102 is rotated again to position the aperture diaphragm 101a having the largest diaphragm, on the optical axis a'.

Figure 9:
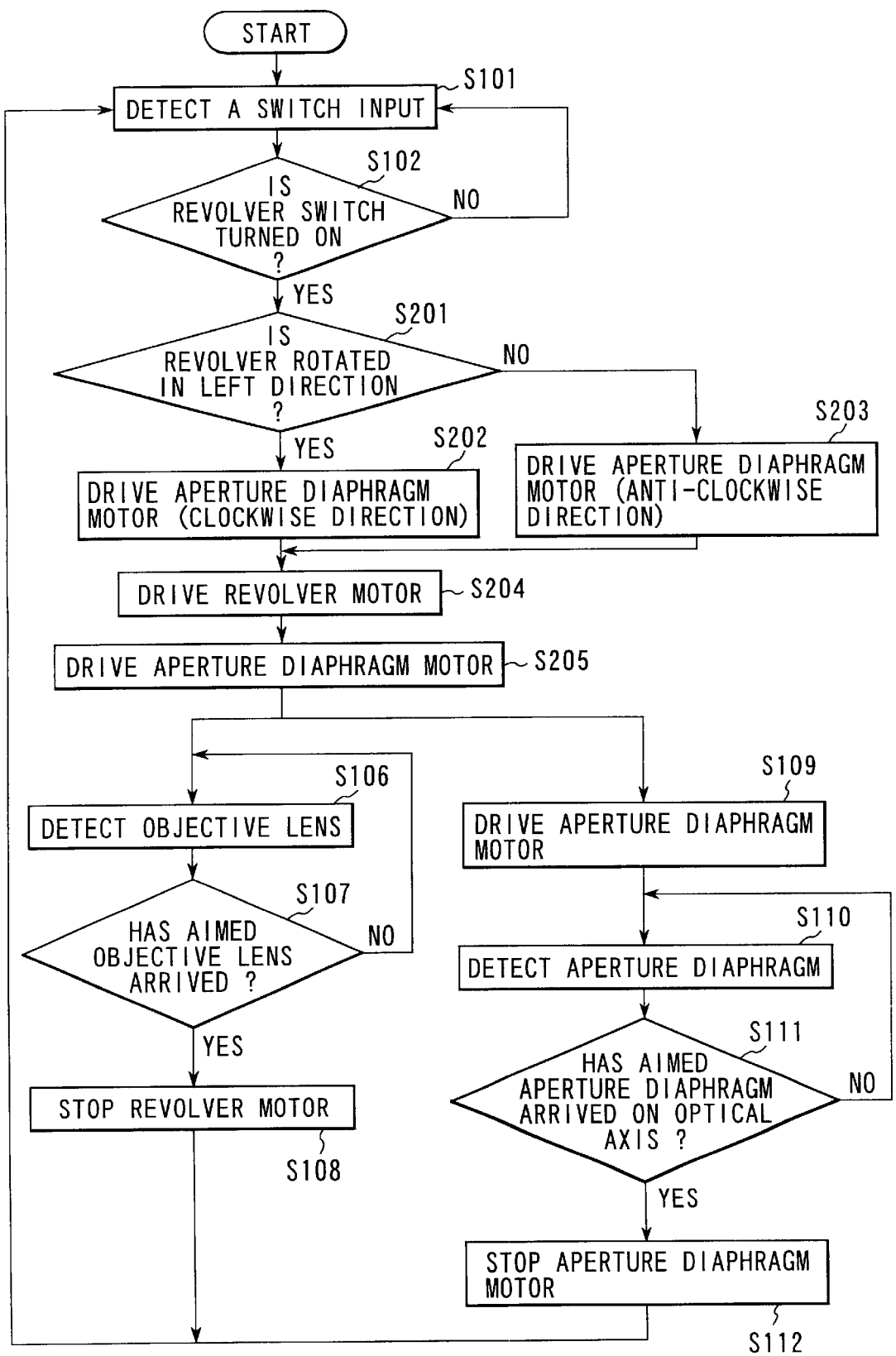
FIG. 9 is a flowchart showing a modification example of the operation sequence during the dark field observation in the present microscope, shown in FIG. 7.

FIG. 9 is a flowchart showing a modification example of the operation sequence during the dark field observation in the present microscope, shown in FIG. 7. In FIG. 9, the same steps as those in FIG. 7 are denoted by same reference symbols. In the operation sequence shown in FIG. 9, rotation of the motorized nosepiece 3 is started in the step S204, and next, the aperture diaphragm turret 102 is rotated by a predetermined angle θ in the step S205. Thereafter, the operation of the steps S106 to S108 and the operation of the steps S109 to S112 are progressed simultaneously. That is, switching of an objective lens 14 and switching of an aperture diaphragm are carried out in parallel.

According to the second operation example described above, the same effects and advantages as those of the second operation example are obtained. Further, the rotation direction of the aperture diaphragm turret 102 is selected in accordance with the rotation direction of the motorized nosepiece 3, so that the illumination light Q is shielded gradually. At the time point when stray light is weakened sufficiently, rotation of the revolving nosepiece 3 is started. Therefore, rotation of the motorized nosepiece 3 can be started before the illumination light Q is perfectly shielded by the aperture diaphragm turret 102. As a result, it is possible to shorten the time required for switching an objective lens, compared with the case where the motorized nosepiece 3 is rotated after the illumination light Q is perfectly shielded.

Next, an operation example during observation based on the bright field illumination observation method will be explained as a third operation example. In this case, in the half-mirror unit 13, the half-mirror 13a for bright field observation is positioned on the optical axes a and a', and in the field diaphragm unit 11, the field diaphragm 11a is inserted in the light passage for the illumination light Q. In the light reduction unit 8, all the ND filters 81 to 83 are pulled out of the light passage.

Figure 10:
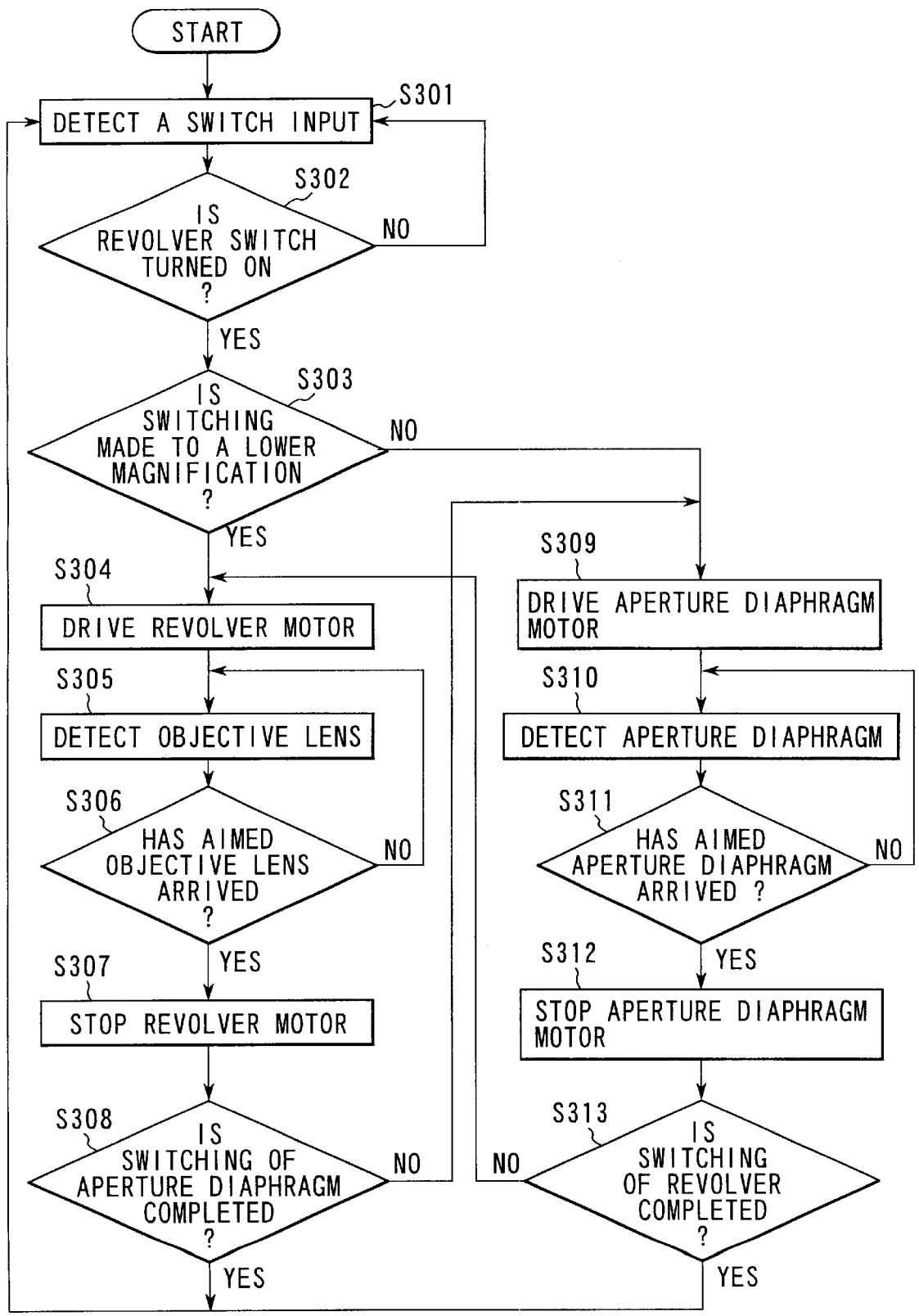
FIG. 10 is a flowchart showing an operation sequence relating to linked operations of the switching of an objective lens and switching of an aperture diaphragm during the bright field observation in the present microscope.

FIG. 10 is a flowchart showing an operation sequence relating to linked operations of the switching of an objective lens and switching of an aperture diaphragm during the bright field observation in the present microscope. The control-circuit/power-source-circuit 21 detects an input from the operation section 22 in the step S301, and recognizes that either the revolving nosepiece switch 211 or 212 is turned ON, in the step S302. Then, in the step S303, whether switching of objective lenses is carried out from a high magnification lens to a low magnification lens (where the revolving nosepiece switch (SW-L1) 212 is turned ON) or from a low magnification lens to a high magnification lens (where the revolving nosepiece switch (SW-H1) 211 is turned ON) is determined. At this time, the objective lens currently existing on the optical axis a and an aimed objective lens to be positioned on the optical axis a are recognized by the sensor S4 and the revolving nosepiece control/drive circuit 26.

If switching is carried out from a high magnification lens to a low magnification lens, the objective lenses are switched in the following manner, with maintaining the aperture diaphragm currently used, so that the aimed objective lens arrives on the optical axis a. At first, in the step S304, the control-circuit/power-source-circuit 21 makes the motor (revolving nosepiece motor) 4 be driven by the revolving nosepiece control/drive circuit 26, thereby to rotate the motorized nosepiece 3. In the step S305, the objective lens positioned on the optical axis a is detected. This detection is continuously carried out until a target objective lens arrives on the optical axis a. Further, when the target objective lens arrives on the optical axis a in the step S306, the motor M4 is stopped in the step S307.

At this time, an objective lens having a higher magnification is switched to an objective lens having a lower magnification, and therefore, the aimed objective lens thus switched has a better transmittance so that the observation light amount increases. However, since the aperture diaphragm remains to be high, the aimed objective lens does not yet reach the original brightness of its own at this time point.

In the step S307, switching of the objective lens is finished and the motor M4 is stopped. Then, in the step S308, the control-circuit/power-source-circuit 21 determines whether or not the aperture diaphragm has been switched. In this case, the aperture diaphragm has not yet been switched. The aperture diaphragm is switched to another one which matches with the aimed objective lens, as follows. In case where the aperture diaphragm has been switched, the operation from the step S301 is carried out.

At first, in the step S309, the control-circuit/power-source-circuit 21 drives the motor (aperture diaphragm motor) M1 by the aperture diaphragm control/drive circuit 23, thereby to rotate the aperture diaphragm turret 102. In the step S310, the aperture diaphragm positioned on the optical axis a' is detected. This detection is continuously carried out until an aimed aperture diaphragm arrives on the optical axis a' in the step S311. Further, when the aimed aperture diaphragm arrives in the step S311, the motor M1 is stopped in the step S312.

At this time, both the aimed objective lens and the aperture diaphragm diameter suitable for the lens are obtained for the first time, so the observation light amount increases. However, even during the switching, an observed image gradually becomes bright so that the operator does not feed dazzled but natural switching is achieved without inconveniences.

In the step S312, switching of the aperture diaphragm is completed and the motor M1 stops. Then, in the step S313, the control-circuit/power-source-circuit 21 determines whether or not switching of the objective lens has been completed. If switching of the objective lens has not yet been completed, the operation from the step S304 is carried out. Otherwise, if the switching has been completed, the operation from the step S301 is carried out.

Unlike the above-mentioned case, in the step S303, if an objective lens having a low magnification is switched to an objective lens having a high magnification (where the revolving nosepiece switch (SW-H1) 211 is turned ON), the operation sequence begins with switching of the aperture diaphragm. An objective lens having a low magnification has a high transmittance and therefore provides a bright observed image. However, since the aperture diaphragm is firstly switched to an aperture diaphragm having a small diameter suitable for a high magnification, the observed image is once darkened at first. Next, the objective lens is switched to a lens having high magnification. Therefore, the observed image becomes gradually dark during a procedure until brightness for an aimed objective lens is obtained. As a result, the operator does not feed dazzled but natural switching is carried out without inconveniences.

In the present third operation example, in case where an objective lens having a high magnification is switched to a lens having a low magnification, switching of the objective lens is carried out at first, and the aperture diaphragm is thereafter switched to another one which matches with the objective lens having the low magnification. In case where an objective lens having a low magnification is switched to a lens having a high magnification, the aperture diaphragm is switched to another one which has a diameter suitable for an aimed objective lens, at first, and thereafter, the objective lens is switched to the aimed objective lens. That is, the order of the switching of the objective lens and switching of the aperture diaphragm is changed as follows.

Switching from a high magnification to a low magnification:

(a high magnification, a small diaphragm)→(a low magnification, a small diaphragm)→(a low magnification, a large diaphragm)

Switching from low magnification to a high magnification:

(a low magnification, a large diaphragm)→(a low magnification, a small diaphragm)→(a high magnification, a small diaphragm)

Therefore, during switching of the objective lens, the brightness changes so as to increase gradually or so as to decrease gradually, so that brightness higher than an observed image is not viewed even at an instant with eyes by the observer.

According to the third operation example, during switching of an objective lens and switching of an aperture diaphragm linked therewith, the brightness of an observed image changes naturally and is maintained to be proper regardless of whether an objective lens having a low magnification is switched to a lens having a high magnification or an objective lens having a high magnification is switched to a lens having a low magnification. Therefore, the operator does not feel incongruous. In addition, since the switching operation itself is based only on operation of each switching section, the structure is constructed without wastes.

Next, an operation example during observation based on the bright field illumination observation method will be explained as a fourth operation example. In this case, in the half-mirror unit 13, the half-mirror 13a for bright field observation is positioned on the optical axes a and a', and in the field diaphragm unit 11, the field diaphragm 11a is inserted in the light passage for the illumination light Q. Note that, in the light reduction unit 8, all the ND filters 81 to 83 are pulled out of the light passage.

The memory circuit 31 shown in FIG. 3 contains a table which indicates light amount ratios suitable for objective lenses 14. The light adjust circuit 32 adjust the voltage applied to the illumination light source 6 in accordance with an instruction from the control-circuit/power-source-circuit 21. When switching of an objective lens is instructed by a signal from the revolving nosepiece switches (SW-H1, SW-L1) 211 and 212, the control-circuit/power-source-circuit 21 switches the light amount to a light amount optimum for an aimed objective lens by means of the light adjust circuit 32, based on the data in the memory circuit 31.

As described above, the transmittance of the objective lens decreases as the magnification of the lens increases. Therefore, in order to carry out observation with uniform brightness, it is necessary to increase the light amount when a high magnification is selected and to decrease the light amount when a low magnification is selected. In the present fifth operation example, uniform brightness can be obtained for all of the images observed by respective objective lenses, with use of a light amount ratio table. The present fifth operation example defines the order of switching, with respect to linking between the switching of an objective lens and the light adjust function.

Figure 11:
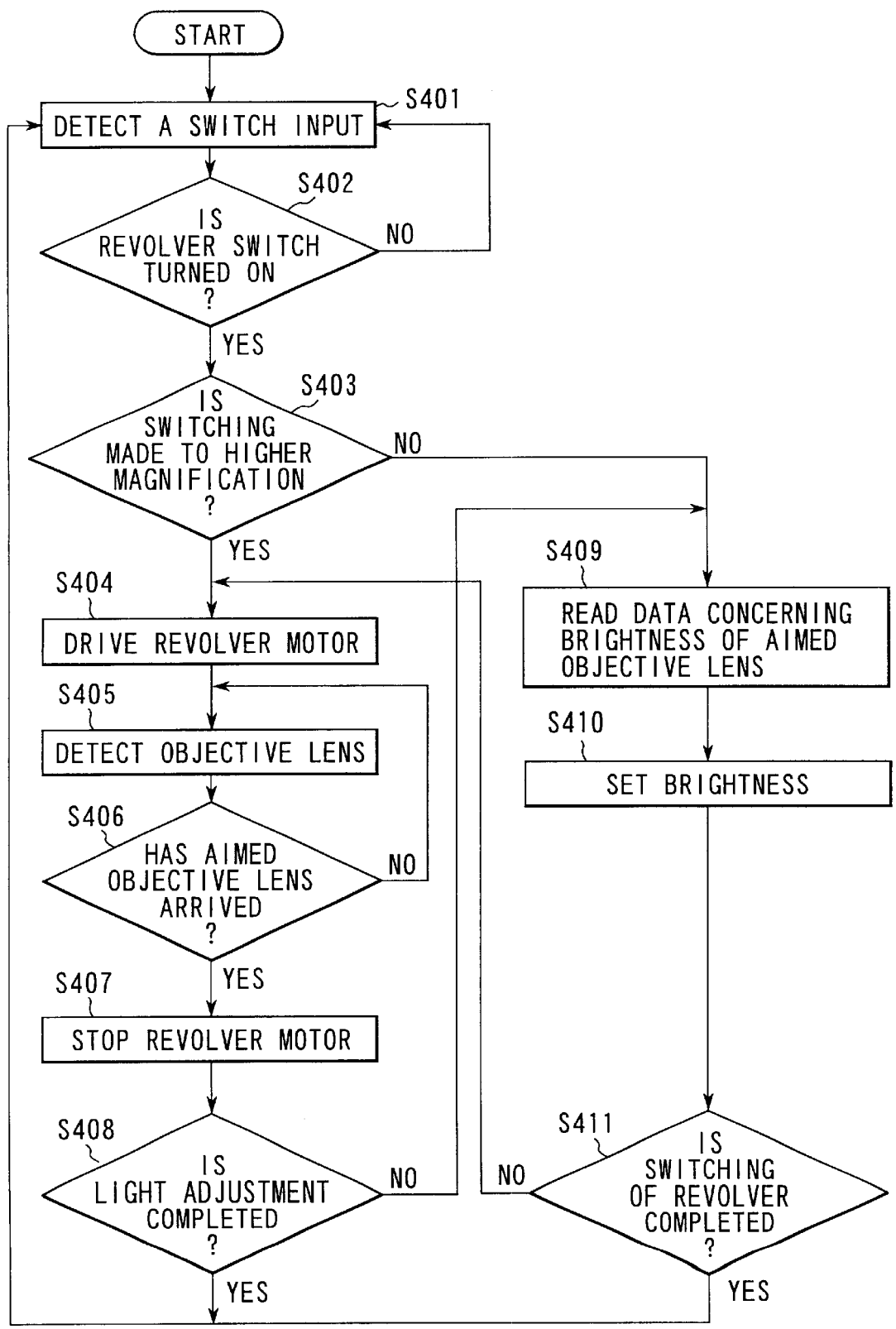
FIG. 11 is a flowchart showing an operation sequence relating to linked operations of the switching of an objective lens and the light adjustment during the bright field observation in the present microscope.

FIG. 11 is a flowchart showing an operation sequence relating to linked operations of the switching of an objective lens and the light adjustment during the bright field observation in the present microscope. The control-circuit/power-source-circuit 21 detects an input from the operation section 22 in the step S401, and confirms that either the revolving nosepiece switch 211 or 212 is turned ON, in the step S402. Then, in the step S403, whether switching of objective lenses is carried out from a low magnification lens to a high magnification lens (where the revolving nosepiece switch (SW-H1) 211 is turned ON) or from a high magnification lens to a low magnification lens (where the revolving nosepiece switch (SW-L1) 212 is turned ON) is determined. At this time, the objective lens currently existing on the optical axis a and an aimed objective lens to be positioned on the optical axis a are recognized by the sensor S4 and the revolving nosepiece control/drive circuit 26.

If it is determined in the step S403 that switching is carried out from a low magnification lens to a high magnification lens, the objective lenses are switched in the following manner, with maintaining the current brightness, so that the aimed objective lens arrives on the optical axis a. At first, in the step S404, the control-circuit/power-source-circuit 21 makes the motor (revolving nosepiece motor) M4 be driven by the revolving nosepiece control/drive circuit 26, thereby to rotate the motorized nosepiece 3. In the step S405, the objective lens positioned on the optical axis a is detected. This detection is continuously carried out until an aimed objective lens arrives on the optical axis a. Further, when the target objective lens arrives on the optical axis a in the step S406, the motor M4 is stopped in the step S407. At this time, an objective lens having a lower magnification is switched to an objective lens having a higher magnification, and therefore, the aimed objective lens thus switched has a worse transmittance so that the observation light amount decreases.

In the step S407, switching of the objective lens is finished and the motor M4 is stopped. Then, in the step S408, the control-circuit/power-source-circuit 21 determines whether or not light adjustment has been completed. In this case, light adjustment has not yet been carried out, and therefore, brightness of the illumination light source 6 is adjusted so as to match with an aimed objective lens by the light adjust circuit 32, on the basis of the data in the memory circuit 31. If light adjustment has been completed, the operation from the step S401 is carried out.

At first, in the step S409, the light adjust circuit 32 reads data relating to the brightness of the aimed objective lens, from the memory circuit 31. In the step S410, the circuit 32 sets the brightness of the illumination light source 6. At this time, both the aimed objective lens and the brightness of the illumination light source 6 suitable for the lens are obtained for the first time, so that the light amount increases. However, even halfway during the switching, an observed image becomes once dark and then becomes bright again. Therefore, unnecessarily high brightness is not felt by the operator even at an instant.

After light adjustment is completed, in the step S411 the control-circuit/power-source-circuit 21 determines whether or not switching of the objective lens has been carried out. If switching of the objective lens has not yet been completed, the operation from the step S404 is carried out. Otherwise, if the switching has been completed, the operation from the step S401 is carried out.

Unlike the above-mentioned case, if an objective lens having a high magnification is switched to an objective lens having a low magnification (where the revolving nosepiece switch (SW-L1) 212 is turned ON), the operation sequence begins with adjustment of the illumination light source 6 at first. In this case, since an objective lens having a high magnification has a low transmittance, the light source 6 is bright. However, by firstly decreasing the light amount of the light source 6 to a light amount which provides sufficient brightness even with the objective lens having a low magnification, the observed image becomes dark at first. Next, the objective lens is switched to a lens having a low magnification. Therefore, the observed image becomes dark once and then becomes bright again during a procedure until brightness suitable for the aimed objective lens is obtained (i.e., the observed image recovers its original brightness). This is a convenience for the operator, and unnecessarily high brightness is not felt even at an instant by the operator.

In the present fourth operation example, in case where an objective lens having a high magnification is switched to a lens having a low magnification, light adjustment in compliance with an aimed objective lens is carried out at first (or light reduction using the light reduction unit 8 which will be described later), and thereafter, the objective lens is switched. In case where an objective lens having a low magnification is switched to a lens having a high magnification, the objective lens is switched at first, and thereafter, light adjustment (or light reduction) in compliance with the aimed objective lens is carried out. That is, the order of the switching of the objective lens and switching of the illumination light amount is changed as follows.

Switching from a high magnification to a low magnification:

(a high magnification, a large light amount)→(a high magnification, a small light amount)→(a low magnification, a small light amount)

Switching from a low magnification to a high magnification:

(a low magnification, a small light amount)→(a high magnification, a small light amount)→(a high magnification, a large light amount)

Therefore, during switching of the objective lens, the brightness changes to be bright→dark→bright, so that brightness higher than an observed image is not viewed even at an instance by the observer, with the currently used objective lens and with the aimed objective lens.

According to the fourth operation example, during switching of an objective lens and light adjustment linked therewith, uniform brightness can be obtained even when an objective lens is switched, regardless of whether an objective lens having a low magnification is switched to a lens having a high magnification or an objective lens having a high magnification is switched to a lens having a low magnification. The brightness of an observed image changes naturally and is maintained to be proper. Therefore, the operator does not feel incongruous. In addition, since the switching operation itself is based only on the operation of each of the switching section and the light adjustment section, the structure can be considered as being constructed without wastes. The above fifth operation example defines the order of linked operations, and whole of these switching operations can be achieved within 1 sec. in total. Thus, control can be performed so smoothly that the operator feels that the linked operations are carried out substantially at the same time.

Next, an operation example for switching of the aperture diaphragm in the observation based on the bright field illumination observation method will be explained as a fifth operation example. As shown in FIG. 3, the aperture diaphragm unit 10 has a memory circuit 27 and an aperture diaphragm control/drive circuit 23 for selecting an aperture diaphragm having an optimum diameter, linked with switching of an objective lens. By means of the aperture diaphragm switches (SW-H2, L2) 221 and 222 of the operation section 22, the aperture diaphragm for one same objective lens can be switched to another one which has a diameter larger or smaller than that of the aperture diaphragm stored in the memory circuit 27. That is, the depth or the contrast is increased by reducing the aperture diaphragm in relation to the pupil diameter of the objective lens, so that the diameter of the aperture diaphragm can be adjusted under circumstances. When the aperture diaphragm switch (SW-H2) 221 is pushed, the aperture diaphragm is switched to another one which has a larger diameter. When the aperture diaphragm switch (SW-L2) 222 is pushed, the aperture diaphragm is switched to another one which has a smaller diameter.

Data concerning the brightness at the diameter of each aperture diaphragm is previously stored, together with a table concerning the preset brightness of each objective lens, in the memory circuit 31. In this case, when the aperture diaphragm is switched to one having a larger diameter by the aperture diaphragm switch 221 while maintaining one same objective lens, an observed image becomes bright. Therefore, the illumination light amount of the illumination light source 6 is decreased by the light adjust circuit 32 on the basis of the data in the memory circuit 31, by an instruction from the control-circuit/power-source-circuit 21. In addition, when the aperture diaphragm is switched to one having a smaller diameter by the aperture diaphragm switch 222, the observed image becomes dark. Therefore, the illumination light amount of the illumination light source 6 is increased by the light adjust circuit 32 on the basis of the data in the memory circuit 31, by an instruction from the control-circuit/power-source-circuit 21. Accordingly, an operator can switches the aperture diaphragm while using one same objective lens, so that observation can be performed with equal brightness before and after the switching and the operator feels no unnatural change of light amount.

Next, an operation example for switching of an aperture diaphragm in the observation based on the bright field illumination observation method will be explained as a sixth operation example. In this case, in the half-mirror unit 13, the half-mirror 13a for bright field observation is positioned on the optical axes a and a', and in the field diaphragm unit 11, the field diaphragm 11a is inserted in the light passage for the illumination light Q. In the light reduction unit 8, all the ND filters 81 to 83 are pulled out of the light passage. In the present seventh operation example, the order of switching is defined with respect to linkage between the switching of an aperture diaphragm and the light adjustment function.

Figure 12:
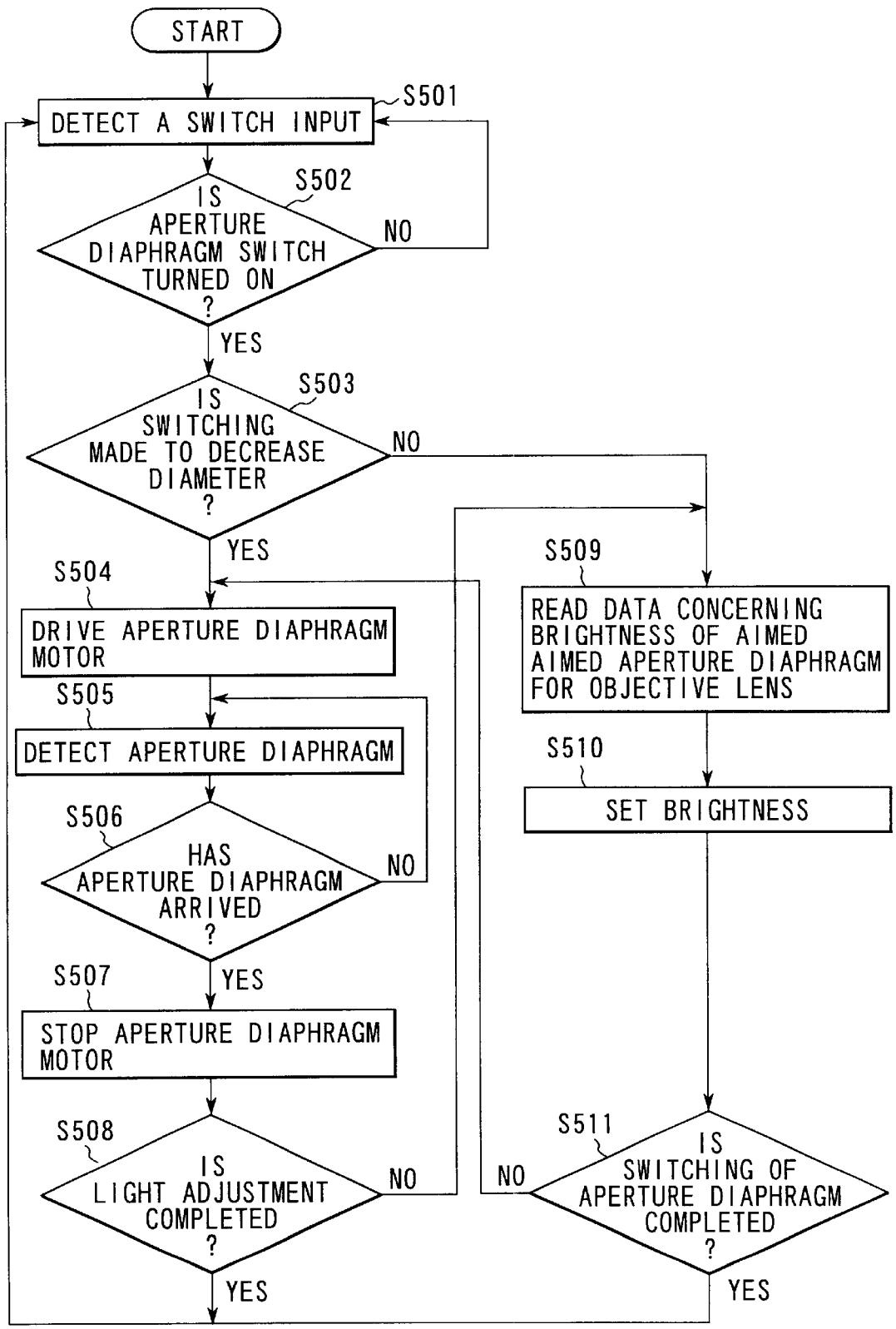
FIG. 12 is a flowchart showing an operation sequence relating to linkage between the switching of an aperture diaphragm and the light adjustment during the bright field observation in the present microscope.

FIG. 12 is a flowchart showing an operation sequence relating to linkage between the switching of an aperture diaphragm and the light adjustment during the bright field observation in the present microscope. The control-circuit/power-source-circuit 21 detects an input from the operation section 22 in the step S501, and confirms that either the aperture diaphragm switch 221 or 222 is turned ON, in the step S502. Then, in the step S503, whether switching of aperture diaphragms is carried out from one having a large diameter to one having a small diameter (where the aperture diaphragm switch (SW-L2) 222 is turned ON) or from one having a small diameter to one having a large diameter (where the aperture diaphragm switch (SW-H2) 221 is turned ON) is determined. At this time, the diameter of the aperture diaphragm currently existing on the optical axis a', and the diameter (position) of an aimed aperture diaphragm to be positioned on the optical axis a' are recognized by the sensor S1 and the aperture diaphragm control/drive circuit 23.

If it is determined in the step S503 that switching is carried out from an aperture diaphragm having a large diameter to an aperture diaphragm having a small diameter, the aperture diaphragm is switched as follows while maintaining the brightness of the illumination light source 6, so that the aperture diaphragm having the aimed diameter is let arrive on the optical axis a'. At first, in the step S504, the control-circuit/power-source-circuit 21 makes the motor (aperture diaphragm motor) M1 be driven by the aperture diaphragm control/drive circuit 23, thereby to rotate the aperture diaphragm turret 102. In the step S505, the aperture diaphragm positioned on the optical axis a' is detected. This detection is continuously carried out until the aperture diaphragm having the aimed diameter arrives on the optical axis a'. Further, when the aimed aperture diaphragm arrives on the optical axis a' in the step S506, the motor M1 is stopped in the step S507. At this time, the aperture diaphragm is switched to the aimed aperture diaphragm having a small diameter, and therefore, the illumination efficiency is low and the observation light amount is lowered.

In the step S507, switching of the aperture diaphragm is finished and the motor M1 is stopped. Then, in the step S508, the control-circuit/power-source-circuit 21 determines whether or not light adjustment has been completed. In this case, light adjustment has not yet been carried out, and therefore, brightness of the illumination light source 6 is adjusted so as to match with the diameter of the aimed aperture diaphragm in relation to the objective lens currently existing on the optical axis a, by the light adjust circuit 32, on the basis of the data in the memory circuit 31. Otherwise, if light adjustment has been completed, the operation from the step S501 is carried out.

At first, in the step S509, the light adjust circuit 32 reads data relating to the brightness for the aimed aperture diaphragm in relation to the objective lens currently used, from the memory circuit 31. In the step S510, the circuit 32 sets the brightness of the illumination light source 6. At this time, both the aimed aperture diaphragm and the brightness suitable for the diaphragm are obtained for the first time, so that the light amount increases. However, even halfway during the switching, an observed image becomes once dark and then becomes bright again (i.e., the observed image recovers its original brightness). Therefore, unnecessarily high brightness is not felt by the operator even at an instant.

After light adjustment is completed, the control-circuit/power-source-circuit 21 determines whether or not switching of the aperture diaphragm has been completed, in the step S511. If switching of the aperture diaphragm has not yet been completed, the operation from the step S504 is carried out. Otherwise, if completed, the operation from the step S501 is carried out.

Unlike the above-mentioned case, if an aperture diaphragm having a small diameter is switched to an aperture diaphragm having a large diameter in the step S503 (where the aperture diaphragm switch (SW-H2) 222 is turned ON), the operation sequence begins with adjustment of the illumination light source 6 at first. In this case, since an aperture diaphragm having a small diameter leads to a low illumination efficiency, the light source 6 is bright. However, by firstly decreasing the light amount of the light source 6 to a light amount which provides sufficient brightness which is obtained when an aperture diaphragm having a large diameter is used, the observed image becomes dark at first. Next, the aperture diaphragm is switched to one having a larger diameter. Therefore, the observed image becomes once dark and then becomes bright again during a procedure until brightness suitable for the aimed aperture diaphragm is obtained. This is a convenience for the operator, and unnecessarily high brightness is not felt even at an instant by the operator.

In the present sixth operation example, when the aperture diaphragm is changed arbitrarily, adjustment of the brightness suitable for the diameter of the aperture diaphragm is carried out by light adjustment (or by light reduction by means of the light reduction unit 8). That is, while using one same objective lens, the illumination light amount is increased in case of reducing the diaphragm of the aperture diaphragm, and the illumination light amount is decreased in case of increasing the diameter of the aperture diaphragm. It is therefore possible to obtain continuously stable brightness.

In case where adjustment of the aperture diaphragm is carried out from a small diameter to a large diameter, light adjustment (or light reduction) in compliance with the diameter of an aimed aperture diaphragm is carried out at first, and thereafter, the aperture diaphragm is switched to the aimed aperture diaphragm. In case where adjustment of the aperture diaphragm is carried out from a large diameter to a small diameter, the aperture diaphragm is switched at first to an aimed aperture diaphragm, and thereafter, light adjustment (or light reduction) in compliance with the diameter of the aimed aperture diaphragm is carried out. That is, the order of the switching of the aperture diaphragm and the switching of the illumination light amount is changed as follows.

Switching from an aperture diaphragm having a small diameter to one having a large diameter:

(a small diameter, a large light amount)→(a small diameter, a small light amount)→(a large diameter, a small light amount)

Switching from an aperture diaphragm having a large diameter to one having a small diameter:

(a large diameter, a small light amount)→(a small diameter, a small light amount)→(a small diameter, a large light amount)

Therefore, during switching of an aperture diaphragm, the brightness changes so as to become bright→dark→bright, so that brightness higher than an observed image is not viewed even at an instant by the observer, with the diameter of a currently used aperture diaphragm and with the diameter of an aimed aperture diameter.

According to the sixth operation example, even when only the aperture diaphragm is switched while using one same objective lens, observation can be carried out with uniform brightness and no unnatural change of light amount is caused. Further, during switching of only the aperture diaphragm and the light adjustment linked therewith, in spite of increase or decrease direction of the diameter of the aperture diaphragm, the brightness of an observed image changes naturally and uniform brightness can be obtained finally. Therefore, the operator does not feel incongruous. In addition, since the switching operation itself is based only on the operation of each of the switching section and the light adjustment section, the structure can be considered as including no wastes. The above seventh operation example defines the order of linked operations, and whole of these switching operations can be achieved within 1 sec. in total. Thus, control can be performed so smoothly that the operator feels that the linked operations are carried out substantially at the same time.

Next, an operation example of switching between the bright field illumination observation method and the dark field illumination observation method will be explained as a seventh operation example. The half-mirror unit 13 is equipped with an half-mirror 13a for the bright field illumination and an half-mirror 13b for the dark field illumination. The half-mirror control/drive circuit 25 drives the motor M3 thereby to rotate the half-mirror unit 13, so that the half-mirror 13a for the bright field illumination or the half-mirror 13b for the dark-field illumination is switched on the optical axes a and a'. This switching is performed in a manner that an operator operates the bright field switch (BF) 231 or the dark field switch (DF) 232.

In the bright field observation, the illumination light source 6 is normally used with the light amount at an intermediate level or so, and is adjusted in accordance with the magnification of the objective lens using the diameter of the aperture diaphragm. In the dark field observation, since illumination light does not directly enter into the observation view field, the illumination light amount is arranged to be large as much as possible. Therefore, the aperture diaphragm is released (opened) to increase the light amount of the illumination light source 6. Accordingly, if the status is switched from the dark field observation to the bright field observation without changing the illumination light amount, the large light amount for the dark field observation enters into the observation field.

Hence, in the present seventh operation example, either the half-mirror or the aperture diaphragm and the illumination light amount are switched earlier, depending on whether the switching is performed from the dark field observation to the bright field observation or inversely.

Figure 13:
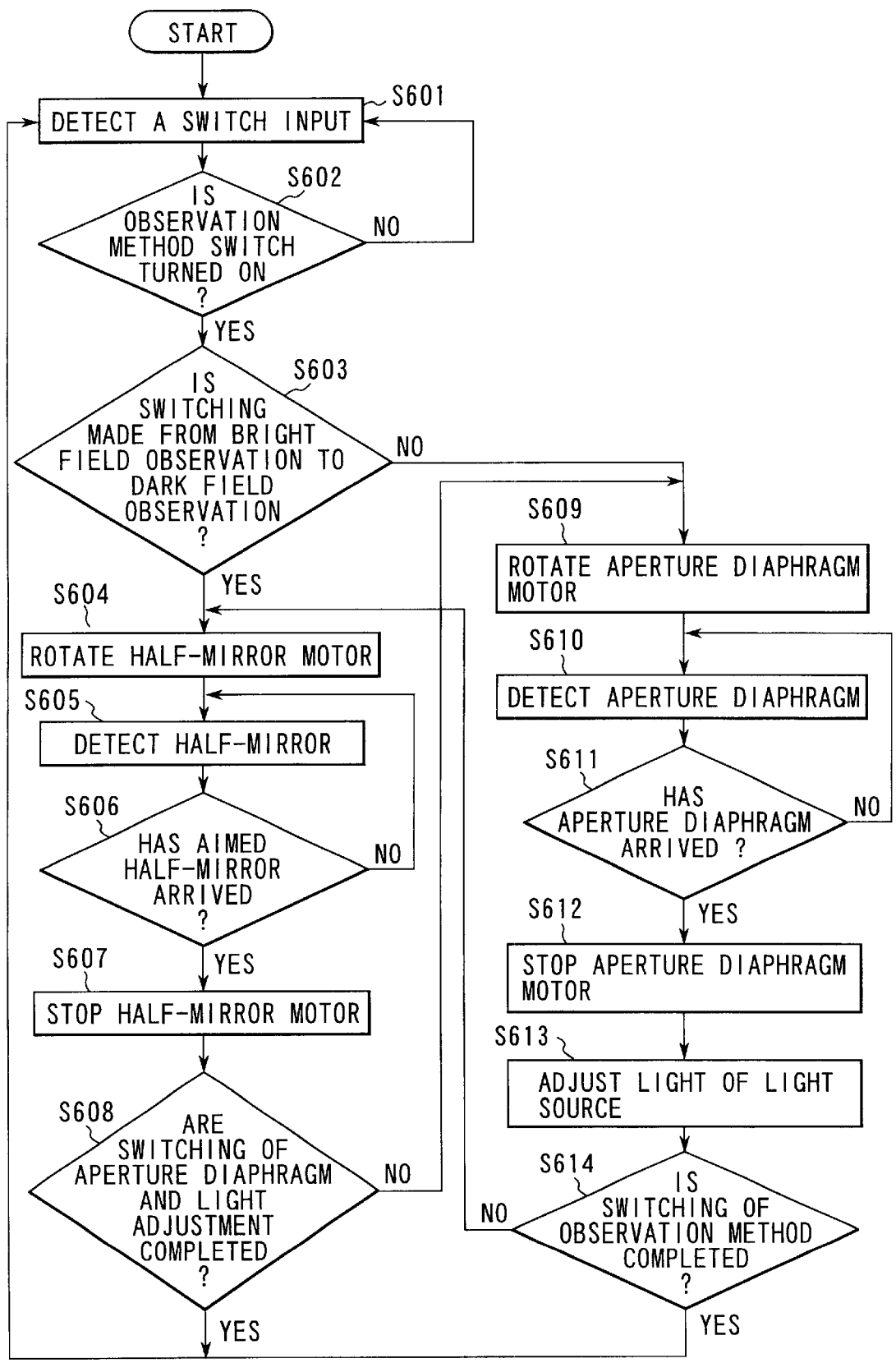
FIG. 13 is a flowchart showing an operation sequence relating to switching operation between the bright field observation method and the dark field observation method in the present microscope.

FIG. 13 is a flowchart showing an operation sequence relating to switching operation between the bright field observation method and the dark field observation method in the present microscope. The control-circuit/power-source-circuit 21 detects an input from the operation section 22 in the step S601, and confirms that either the bright field switch (BF) 231 or the dark field switch (DF) 232 is turned ON, in the step S602. Then, in the step S603, whether switching is carried out from the bright field observation to the dark field observation (where the dark field switch (DF) 232 is turned ON) or from the dark field observation to the bright field observation (where the bright field switch (BF) 231 is turned ON) is determined. At this time, the half-mirror currently existing on the optical axis a is recognized by the sensor S3 and the half-mirror control/drive circuit 25.

If it is determined in the step S603 that switching is carried out from the bright field observation to the dark field observation, the control-circuit/power-source-circuit 21 makes the motor (half-mirror motor) M3 be driven by the half-mirror control/drive circuit 25, thereby to rotate the half-mirror unit 13, in the step S604. In the step S605, the half-mirror positioned on the optical axis a is detected. This detection is continuously carried out until the aimed half-mirror 13b arrives on the optical axis a in the step S606. Further, when the aimed half-mirror 13b arrives on the optical axis a in the step S606, the motor M3 is stopped in the step S607.

At this time, the half-mirror 13a is switched to the half-mirror 13b. However, since the aperture diaphragm and the light amount of the illumination light source 6 remain unchanged, the brightness suitable for the dark field observation is not yet reached.

In the step S607, switching of the half-mirror is completed and the motor M3 is stopped. Then, in the step S608, the control-circuit/power-source-circuit 21 determines whether or not switching of the aperture diaphragm and light adjustment of the illumination light source 6 have been completed. In this case, since the switching and the light adjustment have not yet been completed, switching of the aperture diaphragm and adjustment of the illumination light source 6 are carried out in the following manner. Otherwise, if completed, the operation from the step S601 is carried out.

At first, in the step S609, the control-circuit/power-source-circuit 21 makes the motor (aperture diaphragm motor) M1 be driven by the aperture diaphragm control/drive circuit 23, thereby to rotate the aperture diaphragm turret 102. In the step S610, the aperture diaphragm positioned on the optical axis a' is detected. This detection is continuously carried out until the aperture diaphragm having the aimed diameter arrives on the optical axis a'. Further, when the aimed aperture diaphragm (which has the largest diameter in this case) arrives on the optical axis a' in the step S611, the motor M1 is stopped in the step S612. Subsequently, in the step S613, light adjustment of the illumination light source 6 (which means an increase of the light amount in this case) is carried out.

At this time, an aimed half-mirror and an aperture diaphragm diameter and a light amount of the illumination light source which are suitable for the half-mirror are obtained for the first time, and the observation light amount increases. However, even halfway during the switching, an observed image becomes gradually bright, so that an operator does not feel dazzled and natural switching is achieved without inconveniences.

Further, in the step S614, the control-circuit/power-source-circuit 21 determines whether or not switching of the half-mirror has been completed. If switching of the half-mirror has not yet been completed, the operation from the step S604 is carried out. Otherwise, if completed, the operation from the step S601 is carried out.

Unlike the above-mentioned case, if the half-mirror for the dark field observation is switched to the half-mirror for the bright field observation (where the bright field switch (BF) 231 is turned ON) in the step S603, the operation sequence begins with switching of the aperture diaphragm and adjustment of light. During the dark field observation, the diameter of the aperture diaphragm is normally the largest, and the light amount of the light source is large. However, by firstly switching the aperture diaphragm to the aperture diaphragm having a smaller diameter and by decreasing the light amount of the light source, the observed image becomes dark at first. Next, the half-mirror is switched to the half-mirror 13a. Therefore, the observed image becomes once dark and then becomes gradually dark during a procedure until the half-mirror is switched to the half-mirror 13a. Accordingly, the operator does not feel dazzled and natural switching is achieved without inconveniences.

In the example shown in FIG. 13, switching of the aperture diaphragm is carried out firstly in the adjustment of the illumination light amount, and light adjustment of the light source is carried out next. However, either the switching of the aperture diaphragm or the light adjustment may be carried out at first, or both of them may be carried out simultaneously.

According to the seventh operation example described above, in case where the bright field observation is switched to the dark field observation, the half-mirror is switched to the half-mirror for the dark field observation, and thereafter, switching of the aperture diaphragm and light adjustment are carried out, to increase the observation light amount. In case where the dark field observation is switched to the bright field observation, switching of the aperture diaphragm and light adjustment are carried out to decrease the observation light amount, and thereafter, the half-mirror is switched to the half-mirror for the bright field observation to increase the observation light amount. That is, in none of these cases, switching of the aperture diaphragm and light adjustment for the dark field observation are not carried out in a situation in which a half-mirror for the bright field observation is positioned on the optical axis. Therefore, change of the brightness of an observed image is natural when switching the observed image, so that the operator does not feel incongruous.

Note that the present invention is not limited to the above-mentioned embodiment but may be modified and practiced as follows.

FIG. 14 is a view showing the structure of a modification example of the aperture diaphragm turret. In the above embodiment, the aperture diaphragm turret 102 is rotated to switch the aperture diaphragm, step by step. However, for example, the aperture diaphragm may be switched by a parallel movement using a rack and a pinion, as shown in FIG. 14.

In FIG. 14, a pinion 14 is provided on the rotation shaft of the stepping motor 40, and a rack 43 is formed at an end portion of a parallel motion slider 42. The pinion 41 and the rack 43 are engaged with each other. The stepping motor 40 is driven in response to a pulse signal generated by the aperture diaphragm control/drive circuit 23. By this driving, the parallel motion slider 42 moves in parallel through the pinion 41 and the rack 43.

A plurality of aperture diaphragms 44a to 44f respectively having diameters different from each other are formed in the parallel motion slider 42. In addition, click grooves 45a to 45f are respectively formed so as to correspond to the aperture diaphragms 44a to 33f, at the other end of the parallel motion slider 42. Further, a click mechanism consisting of a plate spring 46 and a roller 47 is provided so as to face the click grooves 45a to 45f. By this click mechanism, the parallel motion slider 42 is positioned like in the above embodiment.

Although not shown in the figure, a sensor for detecting the origin of the parallel motion slider 42 and a sensor for detecting any of the aperture diaphragms 44a to 44f positioned near the optical axis a' are comprised, like in the embodiment described above. Detection signals from these sensors are supplied to the aperture diaphragm control/drive circuit 23. In this manner, the aperture diaphragm control/drive circuit 26 is capable of stopping the parallel motion slider 42 accurately at the optical axis a' so that suitable aperture diaphragms 44a to 44f are respectively selected for the objective lenses, like in the embodiment described above.

In the above embodiment, stray light is prevented with use of the aperture diaphragm unit 10. However, the structure may be arranged so as to prevent stray light with use of the aperture diaphragm unit 11. In particular, the field diaphragm 11a which is conjugate with a surface of the sample 15 is capable of shielding the illumination itself, and is therefore effective to shield the illumination light Q efficiently.

Also, in the above embodiment, explanation has been made of prevention of stray light when the objective lens 14 is switched in the dark field illumination. The present invention is not limited hitherto. By shielding the illumination light Q, the same effects can be attained for prevention of stray light caused by the illumination light Q halfway while switching the half-mirror 13a or 13b or another optical element, i.e., halfway while switching an observation method. FIG. 5 previously mentioned shows that the sizes m to r of the light shielding portions between all holes of the aperture diaphragms 101a to 101f are larger than the width of illumination light flux Q. In this structure, when any of the aperture diaphragms 101a to 101f is selected in case where the observation method is for the bright field observation, the aperture diaphragm turret 102 is rotated by a predetermined angle when switching the objective lens 14, thereby to prevent various kinds of stray light, like in the above embodiment. In addition, when switching is made between the bright field illumination and the dark field illumination, i.e., when the half-mirror 13a or 13b is switched, stray light caused when switching the half-mirror 13a or 13b can be prevented if control is performed by the control-circuit/power-source circuit 31 such that the aperture diaphragm turret 102 is rotated by a predetermined angle by the aperture diaphragm control/drive circuit 23 so as to shield the illumination light Q, before the half-mirror 13a or 13b is switched by the half-mirror control/drive circuit 25.

Also, in the above embodiment, light adjustment is achieved by changing the voltage to the illumination light source 6 by means of the light adjust circuit 32. However, light adjustment may be achieved by driving the motor M5 by the light reduction unit control/drive circuit 28 so as to insert/pull out a plurality of ND filters 81 to 83 into/from the light passage of the illumination light Q. In addition, the structure may be arranged such that continuous adjustment of light is achieved by a steeples ND wheel. In these cases, in both the switching of an aperture diaphragm and the adjustment of light, data concerning optimum values and tables can further be subdivided for every objective lens. It is therefore possible to set various observed images and brightness.

Although the above embodiment shows an example of a microscope based on illumination, perfectly same effects can be obtained in case of a microscope based on transmitted illumination.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An illumination apparatus used for a microscope to guide illumination light to an objective lens attached to a revolving nosepiece, comprising:

a light source for radiating the illumination light;

an optical system for guiding the illumination light radiated from the light source to the objective lens;

an aperture diaphragm switching section, provided in the optical system and having a plurality of aperture diaphragms and a light shielding portion, for switching the aperture diaphragm on the illumination light, linked with motion of the revolving nosepiece, when switching an observation method or the objective lens; and a control circuit for making control so as to shield the illumination light by means of the light shielding portion of the aperture diaphragm switching section, when switching an observation method or the objective lens, wherein the control circuit shields the illumination light by means of the light shielding portion, before switching an observation method or the objective lens, and makes control such that one of the aperture diaphragms that matches with the observation method or the objective lens is positioned on the illumination light, after switching the observation method or the objective lens.

2. An apparatus according to claim 1, wherein the control circuit makes control such that a moving direction of the aperture diaphragms is selected in accordance with a rotation direction of the revolving nosepiece, so as to shield the illumination light.

3. An apparatus according to claim 1, wherein said aperture diaphragm switching section comprises an aperture diaphragm turret which is rotated to switch the aperture diaphragms from one to another.

4. An illumination apparatus used for a microscope to guide illumination light to an objective lens attached to a revolving nosepiece, comprising:

a light source for radiating the illumination light;

an optical system for guiding the illumination light radiated from the light source to the objective lens;

an aperture diaphragm switching section, provided in the optical system and having a plurality of aperture diaphragms and a light shielding portion, for switching the aperture diaphragm on the illumination light, linked with motion of the revolving nosepiece, when switching an observation method or the objective lens; and a control circuit for making control so as to shield the illumination light by means of the light shielding portion of the aperture diaphragm switching section, when switching an observation method or the objective lens, wherein the control circuit makes control such that a moving direction of the aperture diaphragms is selected in accordance with a rotation direction of the revolving nosepiece, so as to shield the illumination light.

5. An apparatus according to claim 4, wherein said aperture diaphragm switching section comprises an aperture diaphragm turret which is rotated to switch the aperture diaphragms from one to another.

* * * * *